US012086353B2

(12) United States Patent
Pyo et al.

(10) Patent No.: US 12,086,353 B2
(45) Date of Patent: Sep. 10, 2024

(54) DISPLAY DEVICE

(71) Applicant: Samsung Display Co., Ltd., Yongin-si (KR)

(72) Inventors: Donghak Pyo, Yongin-si (KR); Jungkook Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/188,327

(22) Filed: Mar. 22, 2023

(65) Prior Publication Data

US 2023/0350518 A1    Nov. 2, 2023

(30) Foreign Application Priority Data

May 2, 2022    (KR) .................. 10-2022-0054420

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0446; G06F 3/0412
See application file for complete search history.

(56) References Cited

U.S. PATENT DOCUMENTS

| 9,377,905 | B1 * | 6/2016 | Grivna | G06F 3/0446 |
| 9,798,412 | B2 | 10/2017 | Hong | |
| 10,437,362 | B2 * | 10/2019 | Choi | G06F 3/041 |
| 2013/0021296 | A1 * | 1/2013 | Min | G06F 3/0448 |
| | | | | 345/173 |
| 2016/0246415 | A1 | 8/2016 | Bae et al. | |
| 2022/0171499 | A1 * | 6/2022 | Han | G06F 3/04164 |

FOREIGN PATENT DOCUMENTS

| KR | 10-2241773 B1 | 4/2021 |
| KR | 10-2277379 B1 | 7/2021 |

* cited by examiner

*Primary Examiner* — Kevin M Nguyen
(74) *Attorney, Agent, or Firm* — Lewis Roca Rothgerber Christie LLP

(57) ABSTRACT

A display device includes a display panel and an input sensing unit on the display panel, the input sensing unit includes sensing pads, sensing electrodes overlapping the display area and arranged in rows and columns, and sensing wirings connecting the sensing pads and the sensing electrodes, the sensing wirings include first trace wirings and second trace wirings on different layers, the sensing electrodes include a first row sensing electrode and a second row sensing electrode, and a third row sensing electrode and a fourth row sensing electrode, the first trace wirings are connected to each of the first row sensing electrode and the second row sensing electrode, and the second trace wirings are connected to each of the third row sensing electrode and the fourth row sensing electrode.

20 Claims, 16 Drawing Sheets

DISPLAY DEVICE

CROSS-REFERENCE TO RELATED APPLICATION

The present application claims priority to and the benefit of Korean Patent Application No. 10-2022-0054420, filed on May 2, 2022, in the Korean Intellectual Property Office, the entire content of which is hereby incorporated by reference.

BACKGROUND

1 Field

Aspects of some embodiments of the inventive concept relate to a display device, and for example, relates to a display device having improved reliability with high touch sensitivity.

2. Description of Related Art

An electronic device such as a smart phone, a digital camera, a laptop computer, a navigation system, and a television that displays images to users includes a display device for displaying the image. The display device may include a display panel that generates and displays images, and may also include a keyboard, a mouse, or an input sensing unit as an input element.

An input sensing unit may be located on the display panel, and when a user touches an input sensing unit such as a touch panel, an input signal may be generated. An input signal generated from the touch panel may be provided to the display panel, and the display panel may display images corresponding to the input signal to the user in response to the input signal provided from the touch panel.

The above information disclosed in this Background section is only for enhancement of understanding of the background and therefore the information discussed in this Background section does not necessarily constitute prior art.

SUMMARY

Aspects of some embodiments of the inventive concept relate to a display device, and for example, to a display device having relatively improved reliability with relatively high touch sensitivity.

According to some embodiments of the inventive concept, a display device that reduces a deviation of a mutual capacitance value occurring in a trace wiring included in an input sensing unit to prevent or reduce deterioration of sensing characteristics and to improve reliability thereof.

According to some embodiments of the inventive concept, a display device includes a display panel divided into a display area and a non-display area and an input sensing unit on the display panel, the input sensing unit includes a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes, the plurality of sensing wirings include a plurality of first trace wirings and a plurality of second trace wirings on different layers, the plurality of sensing electrodes include a first row sensing electrode and a second row sensing electrode adjacent to each other in a first direction, and a third row sensing electrode and a fourth row sensing electrode adjacent to each other in the first direction, the plurality of first trace wirings are connected to each of the first row sensing electrode and the second row sensing electrode, and wherein the plurality of second trace wirings are connected to each of the third row sensing electrode and the fourth row sensing electrode.

According to some embodiments, each of the plurality of first trace wirings may be connected to a first sensing pad among the plurality of sensing pads, and each of the plurality of second trace wirings may be connected to a second sensing pad adjacent to the first sensing pad among the plurality of sensing pads.

According to some embodiments, the input sensing unit may include a first sensing insulating layer directly on the display panel, a second sensing insulating layer on the first sensing insulating layer, and a third sensing insulating layer on the second sensing insulating layer, the plurality of first trace wirings may be on the first sensing insulating layer, and the plurality of second trace wirings may be on the second sensing insulating layer.

According to some embodiments, the display panel may include a base layer, a circuit element layer on the base layer and including a plurality of insulating layers, a display element layer on the circuit element layer and including a pixel defining layer and a light emitting element, and an encapsulation layer located on the display element layer and covering the light emitting element, and the input sensing unit may be directly on the encapsulation layer.

According to some embodiments, the plurality of first trace wirings may include a (1-1)st trace wiring connected to the first row sensing electrode, and a (1-2)nd trace wiring connected to the second row sensing electrode, and the plurality of second trace wirings may include a (2-1)st trace wiring connected to the third row sensing electrode, and a (2-2)nd trace wiring connected to the fourth row sensing electrode.

According to some embodiments, the plurality of sensing pads may include a first sensing pad, a second sensing pad, a third sensing pad, and a fourth sensing pad sequentially arranged in one direction, the (1-1)st trace wiring may be connected to the first sensing pad, the (2-1)st trace wiring may be connected to the second sensing pad, the (1-2)nd trace wiring may be connected to the third sensing pad, and the (2-2)nd trace wiring may be connected to the fourth sensing pad.

According to some embodiments, the plurality of sensing electrodes may include a first group sensing electrode including the first row sensing electrode, the second row sensing electrode, the third row sensing electrode, and the fourth row sensing electrode and a second group sensing electrode which is spaced apart from the first group sensing electrode in the first direction and includes a fifth row sensing electrode and a sixth row sensing electrode adjacent to each other in the first direction, and a seventh row sensing electrode and an eighth row sensing electrode adjacent to each other in the first direction.

According to some embodiments, each of the first group sensing electrode and the second group sensing electrode may include a first side and a second side spaced apart from each other in a second direction intersecting the first direction, and the plurality of sensing wirings may be connected to the first side of the first group sensing electrode and connected to the second side of the second group sensing electrode.

According to some embodiments, the fifth row sensing electrode and the sixth row sensing electrode may be adjacent to the first group sensing electrode, compared to the seventh row sensing electrode and the eighth row sensing electrode According to some embodiments, the plurality of first trace wirings may be connected to the fifth row sensing electrode and the sixth row sensing electrode, and the plurality of second trace wirings may be connected to the seventh row sensing electrode and the eighth row sensing electrode.

According to some embodiments, the plurality of second trace wirings may be connected to the fifth row sensing electrode and the sixth row sensing electrode, and the plurality of first trace wirings may be connected to the seventh row sensing electrode and the eighth row sensing electrode.

According to some embodiments, the input sensing unit may include a lower wiring area including a portion in which the plurality of sensing wirings are connected to the plurality of sensing pads, and, in the lower wiring area, the plurality of first trace wirings and the plurality of second trace wirings may be alternately arranged with each other.

According to some embodiments, in the lower wiring area, the plurality of first trace wirings and the plurality of second trace wirings may not overlap in a plan view.

According to some embodiments, the input sensing unit may include an upper wiring area including a portion in which the plurality of sensing wirings are connected to the plurality of sensing electrodes, and, in the upper wiring area, some of the plurality of first trace wirings and the plurality of second trace wirings cross each other.

According to some embodiments, in the upper wiring area, the plurality of second trace wirings may not be between two first trace wirings adjacently in the first direction among the plurality of first trace wirings.

According to some embodiments, the display panel may include a first non-bending area, a bending area, and a second non-bending area arranged in the first direction, the first non-bending area may include the display area, and the bending area may be bent around a virtual axis extending in a second direction intersecting the first direction.

According to some embodiments of the inventive concept, a display device includes a display panel divided into a display area and a non-display area and an input sensing unit on the display panel, the input sensing unit includes a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes, the plurality of sensing wirings includes a plurality of first trace wirings and a plurality of second trace wirings on different layers, each of the plurality of first trace wiring is connected to a first sensing pad among the plurality of sensing pads, each of the plurality of second trace wiring is connected to a second sensing pad adjacent to the first sensing pad among the plurality of sensing pads, the plurality of sensing electrodes includes a first row sensing electrode and a second row sensing electrode adjacent to each other in a first direction, and the plurality of first trace wirings are connected to each of the first row sensing electrode and the second row sensing electrode.

According to some embodiments of the inventive concept, a display device includes a display panel divided into a display area and a non-display area and an input sensing unit on the display panel, the input sensing unit includes a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes, the plurality of sensing wirings includes a plurality of first trace wirings and a plurality of second trace wirings on different layers, the input sensing unit includes a lower wiring area including a portion in which the plurality of sensing wirings are connected to the plurality of sensing pads, and the input sensing unit includes an upper wiring area including a portion in which the plurality of sensing wirings are connected to the plurality of sensing electrodes, the plurality of first trace wirings and the plurality of second trace wirings are alternately arranged with each other in the lower wiring area, and some of the plurality of first trace wirings and the plurality of second trace wirings cross each other in the upper wiring area.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1A:
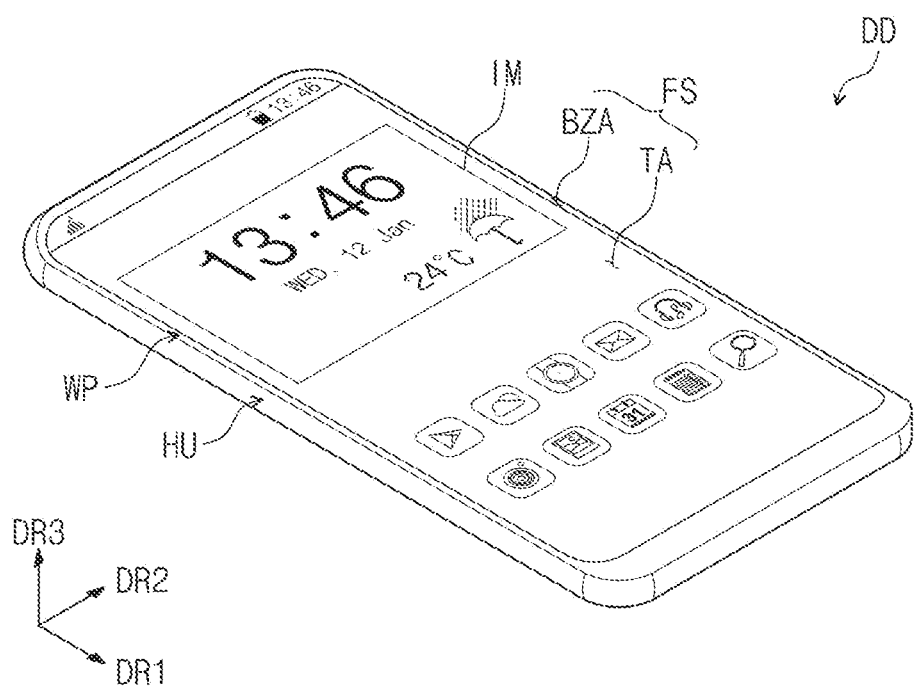
FIG. 1A is an assembled perspective view of a display device according to some embodiments of the inventive concept.

Hereinafter, aspects of some embodiments of the inventive concept will be described in more detail with reference to the drawings.

When a component (or an area, a layer, a part, etc.) is referred to as being "on," "connected to," or "coupled to" another element, it may be directly on, connected to, or coupled to the other component or intervening components may be present.

Like reference numerals denote like elements. Additionally, in the drawings, thicknesses, proportions, and dimensions of components are exaggerated for effective description of technical content. The term "and/or" includes any and all combinations of one or more of the associated listed items.

It will be understood that, although the terms "first", "second", etc. may be used herein to describe various components, these components should not be limited by these terms. These terms are only used to distinguish one component from another component. For example, a first component discussed below could be termed a second component without departing from the teachings of embodiments. The singular forms are intended to include the plural forms as well, unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "include" are intended to specify the presence of stated features, integers, steps, operations, elements, components, or combinations thereof in the disclosure, but do not preclude the presence or addition of one or more other features, integers, steps, operations, elements, components, or combinations thereof.

In the present application, "directly located", "direction on", and other similar terms, may mean that there is no layer, film, region, plate or the like added between the portion of the layer, film, region, plate or the like and another portion. For example, "directly on" may mean arranging one element on another element without additional members such as adhesive members between two elements Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a display device according to some embodiments of the inventive concept will be described with reference to the drawings.

Figure 1B:
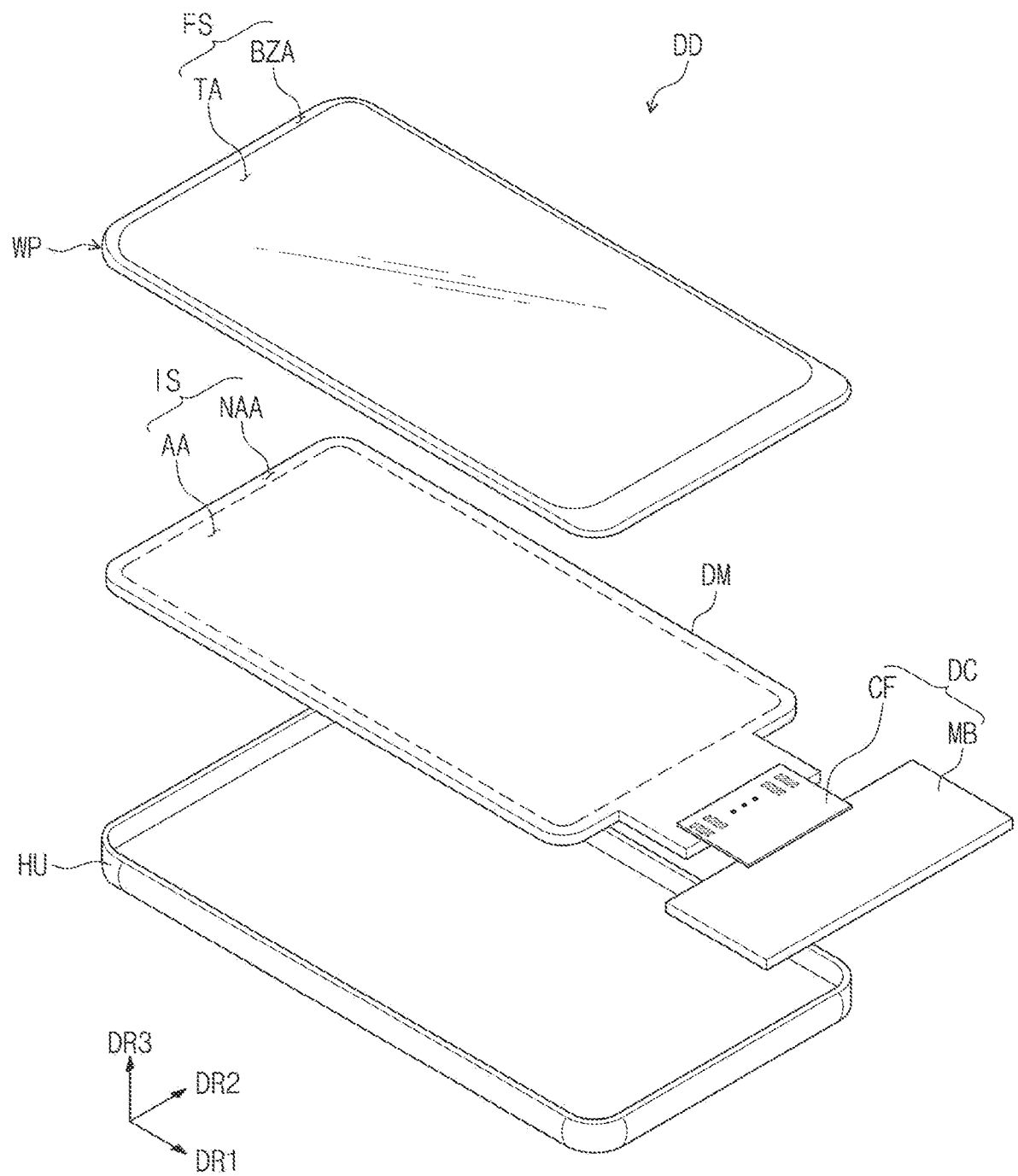
FIG. 1B is an exploded perspective view of a display device according to some embodiments of the inventive concept.
Figure 2:
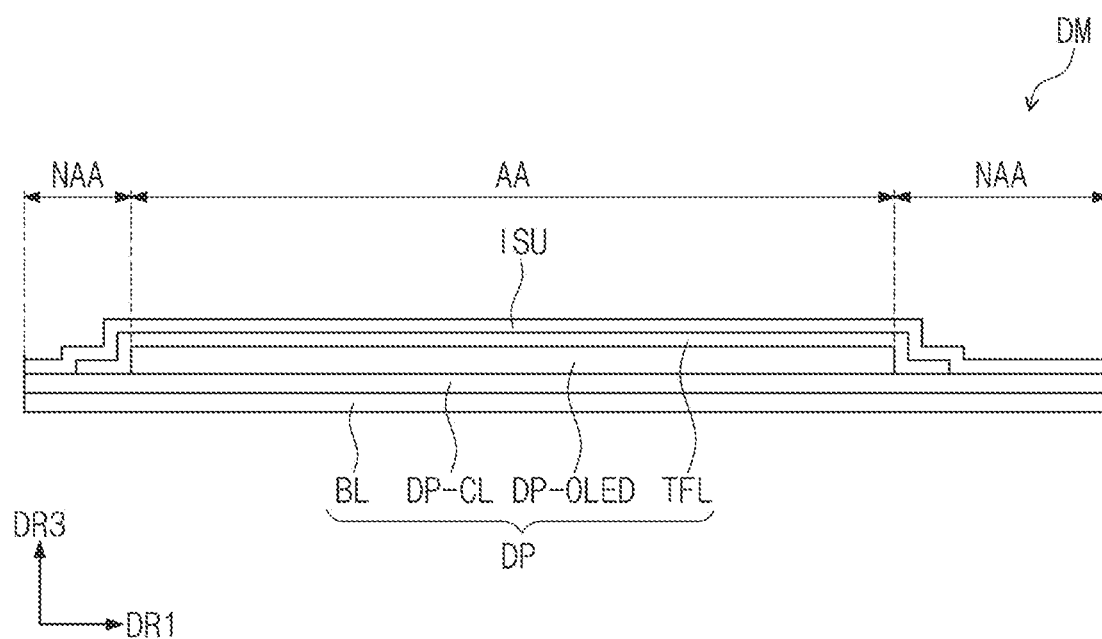
FIG. 2 is a cross-sectional view of a display module according to some embodiments of the inventive concept.

FIG. 1A is an assembled perspective view of a display device according to some embodiments of the inventive concept. FIG. 1B is an exploded perspective view of a display device according to some embodiments. FIG. 2 is a cross-sectional view of a display module according to some embodiments.

Referring to FIG. 1A, a display device DD may be a device activated in response to an electrical signal. The display device DD may display an image IM and may sense an external input TC. The display device DD may include various embodiments. For example, the display device DD may include a tablet, a laptop computer, a computer, a smart television, and the like. Although in describing aspects of some embodiments, the display device DD is shown as a smart phone for the purpose of illustration, embodiments according to the present disclosure are not limited thereto, and the display device DD may be any suitable display device.

The display device DD may display the image IM in a third direction DR3 on a display surface FS parallel to each of first and second directions DR1 and DR2. The display surface FS on which the image IM is displayed may correspond to a front surface of the display device DD and may correspond to a front surface FS of a window member WP. Hereinafter, the same reference numerals are used for the display surface and the front surface of the display device DD, and the front surface of the window member WP. The image IM may include a still image as well as a dynamic image. As an example of the image IM in FIG. 1A, a clock and a plurality of icons are illustrated.

According to some embodiments, a front surface (or an upper surface) and a rear surface (or a lower surface) of each member are defined based on a direction in which the image IM is displayed. The front surface and the rear surface may be opposite to each other in the third direction DR3, and a normal direction of each of the front surface and the rear surface may be parallel to the third direction DR3. A separation distance between the front surface and the rear surface in the third direction DR3 may correspond to a thickness of the display panel DP in the third direction DR3. Meanwhile, the directions indicated by the first to third directions DR1, DR3, and DR3 may be relative concepts and may be converted into other directions. Hereinafter, the first to third directions refer to the same reference numerals as directions indicated by the first to third directions DR1, DR2, and DR3, respectively. Also, in the present specification, "on a plane" or "in a plan view" may mean when viewed from the third direction DR3.

The display device DD according to some embodiments of the inventive concept may detect a user input applied from the outside. The user's input includes various types of external inputs, such as a part of a user's body, light, heat, or pressure. The user's input may be provided in various forms, and the display device DD may sense the user's input applied to a side or a rear side of the display device DD according to a structure of the display device DD, and is not limited to any one embodiment.

Referring to FIGS. 1A and 1B, the display device DD includes the window member WP, a display module DM, a driving circuit DC, and an outer case HU. According to some embodiments, the window member WP and the outer case HU are assembled to form an exterior of the display device DD. According to some embodiments, the outer case HU, the display module DM, and the window member WP may be sequentially stacked in the third direction DR3.

The window member WP may include an optically transparent material. The window member WP may include an insulating panel. For example, the window member WP may be formed of glass, plastic, or a combination thereof.

As described above, the front surface FS of the window member WP defines the front surface of the display device DD. A transmission area TA may be an optically transparent area. For example, the transmission area TA may be an area having a visible light transmittance of about 90% or more.

A bezel area BZA may be an area having relatively low light transmittance, compared to the transmission area TA. The bezel area BZA defines a shape of the transmission area TA. The bezel area BZA may be adjacent to the transmission area TA and may surround the transmission area TA.

The bezel area BZA may have a certain color. The bezel area BZA may cover a peripheral area NAA of the display module DM to block the peripheral area NAA from being viewed from the outside. Meanwhile, this is illustrated by way of an example, and in the window member WP according to some embodiments of the inventive concept, the bezel area BZA may be omitted.

The display module DM may display one or more images IM and may detect an external input. The image IM may be displayed on a front surface IS of the display module DM. The front surface IS of the display module DM includes an active area AA and the peripheral area NAA. The active area AA may be an area activated in response to an electrical signal.

According to some embodiments, the active area AA may be an area in which the image IM is displayed and may be an area in which the external input TC is sensed. The transmission area TA overlaps at least the active area AA. For example, the transmission area TA overlaps the entire surface or at least a portion of the active area AA. Accordingly, the user may recognize the image IM through the transmission area TA or may provide an external input. However, this is illustrated by way of an example, and an area in which the image IM is displayed and an area in which an external input is sensed may be separated from each other in the active area AA, and is not limited to any one embodiment.

The peripheral area NAA may be an area covered by the bezel area BZA. The peripheral area NAA is adjacent to the active area AA. The peripheral area NAA may surround the active area AA. A driving circuit or a driving wiring for driving the active area AA may be located in the peripheral area NAA.

The display module DM may include a display panel and an input sensing unit. The image IM may be substantially displayed on the display panel, and an external input may be substantially sensed by the input sensing unit. The display module DM may include both the display panel and the input sensing unit, and thus the display module DM may display the image IM and detect an external input at the same time. A detailed description thereof will be provided later. The driving circuit DC may include a flexible circuit board CF and a main circuit board MB. The flexible circuit board CF may be electrically connected to the display module DM. The flexible circuit board CF may connect the display module DM to the main circuit board MB. However, this is illustrated as an example, and the flexible circuit board CF according to the inventive concept may not be connected to the main circuit board MB, and the flexible circuit board CF may be a rigid substrate.

The flexible circuit board CF may be connected to pads of the display module DM located in the peripheral area NAA. The flexible circuit board CF may provide an electrical signal for driving the display module DM to the display module DM. The electrical signal may be generated from the flexible circuit board CF or generated from the main circuit board MB.

The main circuit board MB may include various driving circuits for driving the display module DM or connectors for supplying power. The main circuit board MB may be connected to the display module DM through the flexible circuit board CF.

Meanwhile, although FIG. 1B illustrates an unfolded state of the display module DM, at least a portion of the display module DM may be bent. According to some embodiments, a portion of the display module DM to which the main circuit board MB is connected may be bent toward a rear surface of the display module DM, and thus the main circuit board MB may be assembled while overlapping the rear surface of the display module DM.

The outer case HU is assembled to the window member WP to define the appearance of the display device DD. The outer case HU provides a certain internal space. The display module DM may be accommodated in the internal space.

The outer case HU may include a material having a relatively high rigidity. For example, the outer case HU may include a plurality of frames and/or plates formed of glass, plastic, metal, or a combination thereof. The outer case HU may stably protect components of the display device DD accommodated in the internal space from external impact.

Referring to FIG. 2, the display module DM may include a display panel DP and an input sensing unit ISU. The display panel DP may be configured to substantially generate the image IM. The image IM (refer to FIGS. 1A and 1B) generated by the display panel DP may be externally recognized by a user through the transmission area TA (refer to FIGS. 1A and 1B).

The display panel DP may be a light emitting display panel, and embodiments according to the present disclosure are not particularly limited thereto. For example, the display panel DP may be an organic light emitting display panel or an inorganic light emitting display panel. The organic light emitting display panel may be a display panel in which a light emitting layer includes an organic light emitting material. The inorganic light emitting display panel may be a display panel in which a light emitting layer includes quantum dots, quantum rods, or micro LEDs. Hereinafter, the display panel DP will be described as an organic light emitting display panel.

The input sensing unit ISU may be located on the display panel DP. The input sensing unit ISU may sense an external input applied from the outside. The external input may include various types of inputs provided from the outside of the display device DD (refer to FIG. 1A). The external input may be provided in various forms. For example, the external input may include a contact by a part of a body such as a user's hand and an external input (e.g., hovering) applied close to the display device DD or adjacent to the display device DD by a certain distance. In addition, the external input may have various forms such as force, pressure, and light, and is not limited to any one embodiment.

The input sensing unit ISU may be formed on the display panel DP through a continuous process. In this case, the input sensing unit ISU may be directly located on the display panel DP. Meanwhile, in the present specification, "a configuration B is directly located on a configuration A" may mean that another component is not located between the configuration A and the configuration B. For example, an adhesive layer may not be located between the input sensing unit ISU and the display panel DP.

The display panel DP may include a base layer BL, a circuit element layer DP-CL located on the base layer BL, a display element layer DP-OLED, and an upper insulating layer TFL.

The base layer BL may provide a base surface on which the circuit element layer DP-CL, the display element layer DP-OLED, and the upper insulating layer TFL are located. The base layer BL may be a rigid substrate or a flexible substrate capable of bending, folding, or rolling. The base layer BL may be a glass substrate, a metal substrate, or a polymer substrate. However, embodiments of the inventive concept are not limited thereto, and the base layer BL may include an inorganic layer, an organic layer, or a composite material layer.

The base layer BL may have a multi-layered structure. For example, the base layer BL may include a first synthetic resin layer, a multi-layered or single-layered inorganic layer, and a second synthetic resin layer located on the multi-layered or single-layered inorganic layer. Each of the first and second synthetic resin layers may include a polyimide-based resin, and embodiments according to the present disclosure are not particularly limited thereto.

The circuit element layer DP-CL may be located on the base layer BL. The circuit element layer DP-CL may include a plurality of insulating layers, a plurality of conductive layers, and a semiconductor layer. The plurality of conductive layers of the circuit element layer DP-CL may constitute signal lines or a control circuit of a pixel PX (refer to FIG. 3A).

The display element layer DP-OLED may be located on the circuit element layer DP-CL. The display element layer DP-OLED may include organic light emitting elements. However, this is an example, and the display element layer DP-OLED according to some embodiments of the inventive concept may include inorganic light emitting elements, organic-inorganic light emitting elements, or a liquid crystal layer.

The upper insulating layer TFL may include a capping layer and an encapsulation layer to be described later. The upper insulating layer TFL may include an organic layer and a plurality of inorganic layers sealing the organic layer.

The upper insulating layer TFL may be located on the display element layer DP-OLED to protect the display element layer DP-OLED from foreign substances such as moisture, oxygen, and dust particles. The upper insulating layer TFL may seal the display element layer DP-OLED to block moisture and oxygen flowing into the display element layer DP-OLED. The upper insulating layer TFL may include at least one inorganic layer. The upper insulating layer TFL may include an organic layer and a plurality of inorganic layers sealing the organic layer. The upper insulating layer TFL may include a stacked structure in an order of inorganic layer/organic layer/inorganic layer.

The input sensing unit ISU is located on the upper insulating layer TFL. The input sensing unit ISU may be formed on the upper insulating layer TFL through a continuous process. The input sensing unit ISU may be directly located on the display panel DP. That is, a separate adhesive member may not be located between the input sensing unit ISU and the display panel DP. The input sensing unit ISU may be arranged to be in contact with the inorganic layer which is the uppermost part of the upper insulating layer TFL.

According to some embodiments, the display module DM according to some embodiments of the inventive concept may further include a protection member located on the rear surface of the display panel DP, and an anti-reflection member located on a top of the input sensing unit ISU. The anti-reflection member may reduce reflectance of external light. The anti-reflection member may be located directly on the input sensing unit ISU through a continuous process.

The anti-reflection member may include a light blocking pattern overlapping a reflective structure located under the anti-reflection member. The anti-reflection member may further include a color filter. The color filter may be located between the light blocking patterns, and may include a first color filter, a second color filter, and a third color filter corresponding to a first color pixel, a second color pixel, and a third color pixel.

Figure 3A:
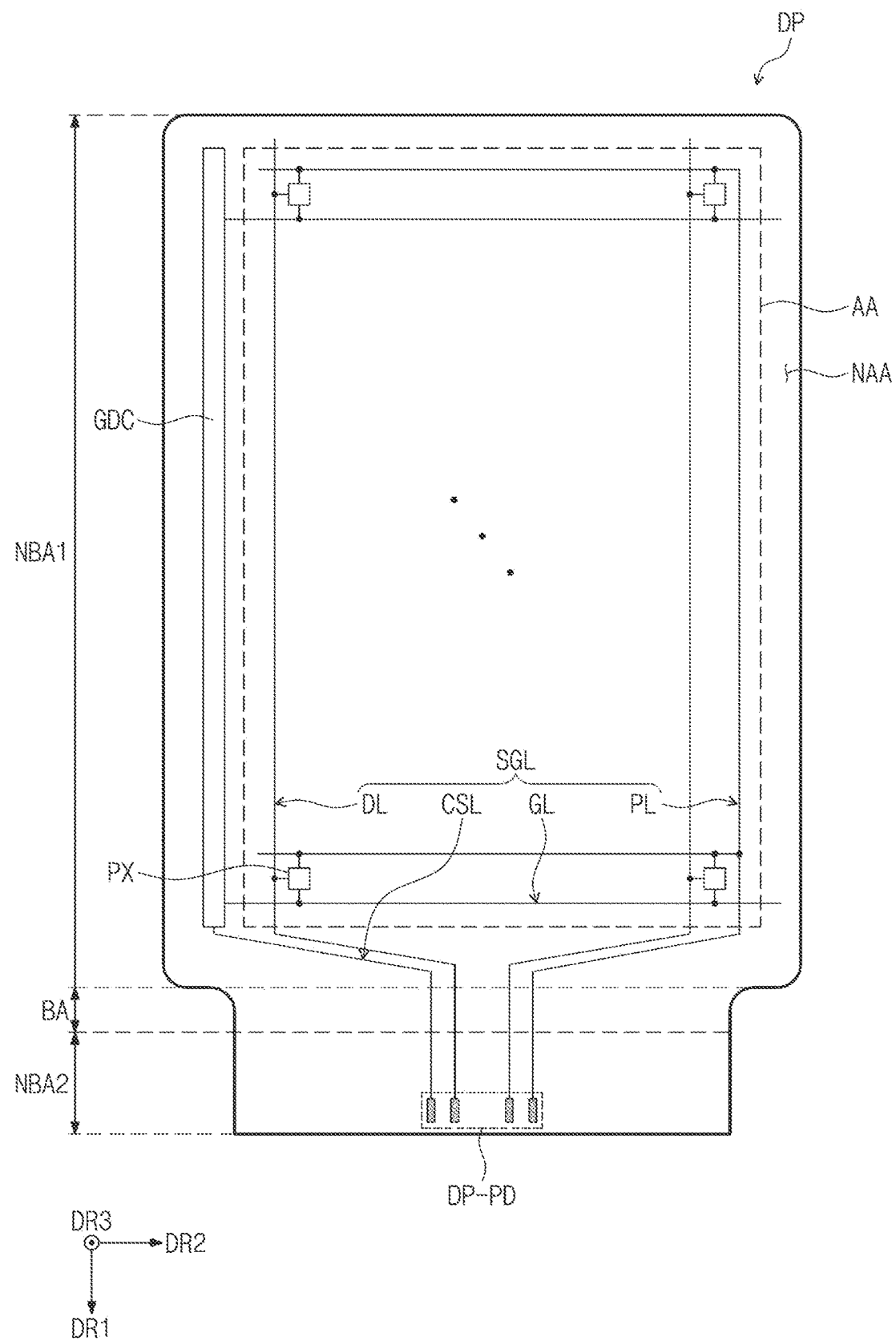
FIG. 3A is a plan view of a display panel according to some embodiments of the inventive concept.
Figure 3B:
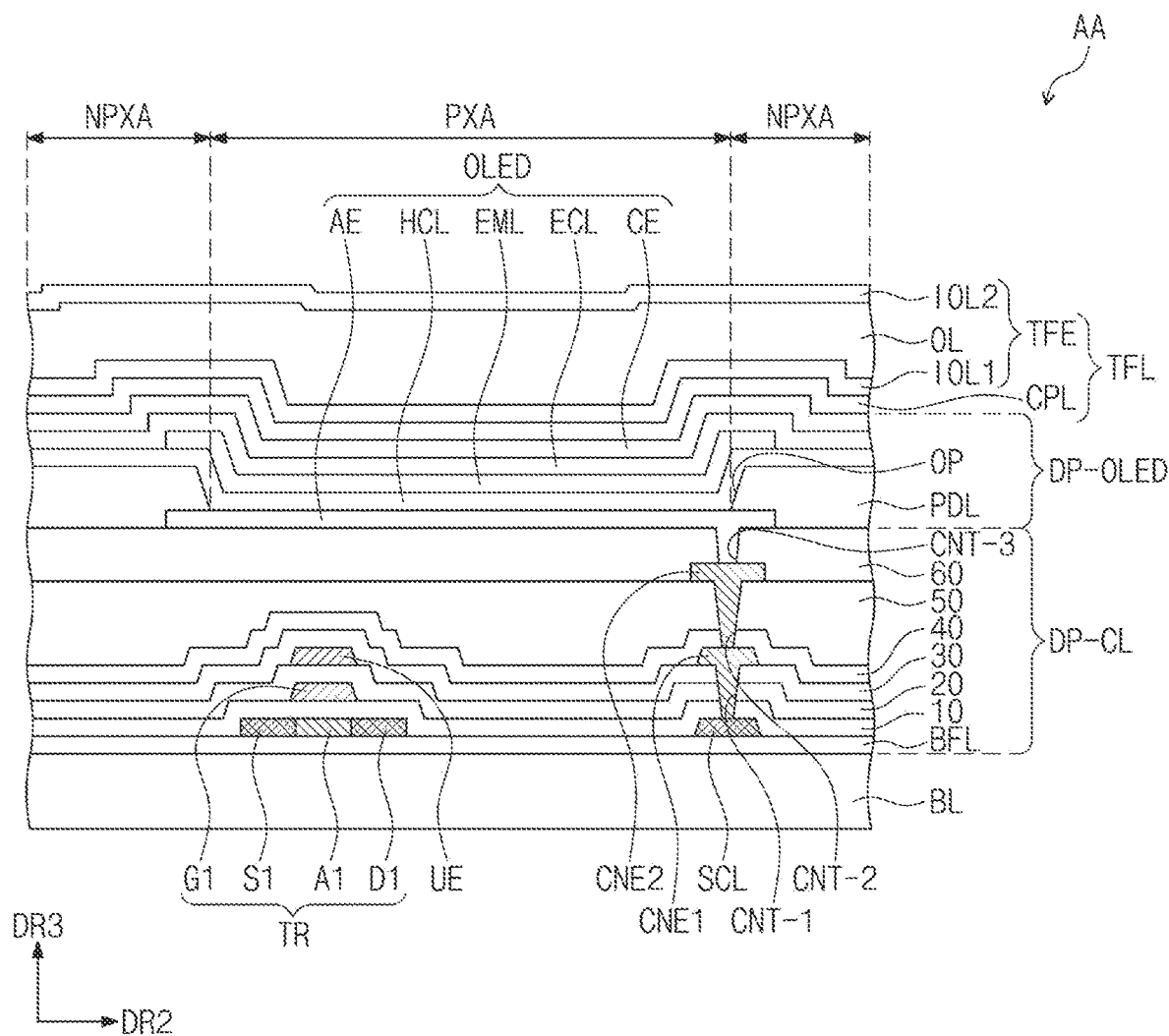
FIG. 3B is a cross-sectional view of a display panel according to some embodiments of the inventive concept.

FIG. 3A is a plan view of a display panel according to some embodiments of the inventive concept. FIG. 3B is a cross-sectional view of a display panel according to some embodiments.

Referring to FIG. 3A, a display panel DP may be divided into an active area AA and a peripheral area NAA in a plan view. The active area AA of the display panel DP may be an area in which an image is displayed, and the peripheral area NAA may be an area in which a driving circuit or driving wiring is located. Light emitting elements of each of a plurality of pixels PX may be located in the active area AA. The active area AA may overlap at least a portion of the transmission area TA (refer to FIG. 1B) of the window member WP (refer to FIG. 1B), and the peripheral area NAA may be covered by the bezel area BZA (refer to FIG. 1B) of the window member WP (refer to FIG. 1B). The active area AA and the peripheral area NAA of the display panel DP may respectively correspond to the active area AA and the peripheral area NAA of the display module DM shown in FIG. 1B.

According to some embodiments, the display panel DP may include a plurality of pixels PX, (hereinafter, pixels), a plurality of signal lines SGL, a scan driving circuit GDC, and a display pad part DP-PD.

Each of the pixels PX may include a light emitting element and a plurality of transistors connected thereto. The pixels PX may emit light in response to an applied electrical signal.

The signal lines SGL may include scan lines GL, data lines DL, a power line PL, and a control signal line CSL. The scan lines GL may be respectively connected to a corresponding pixel PX among the pixels PX. The data lines DL may be respectively connected to a corresponding pixel PX among the pixels PX. The power line PL may be connected to the pixels PX to provide a power voltage. The control signal line CSL may provide control signals to the scan driving circuit GDC.

The scan driving circuit GDC may be located in the peripheral area NAA. The scan driving circuit GDC may generate scan signals and sequentially output the scan signals to the scan lines GL. The scan driving circuit GDC may further output another control signal to a driving circuit of the pixels PX.

The scan driving circuit GDC may include a plurality of thin film transistors formed through the same process as the driving circuit of the pixels PX, for example, a Low Temperature Polycrystalline Silicon (LTPS) process or a Low Temperature Polycrystalline Oxide (LTPO) process.

In the display panel DP according to some embodiments, a portion of the display panel DP may be bent. The display panel DP may include a first non-bending area NBA1, a second non-bending area NBA2 spaced apart from the first non-bending area NBA1 in the first direction DR1, and a bending area BA defined between the first non-bending area NBA1 and the second non-bending area NBA2. The first non-bending area NBA1 may include the active area AA and a portion of the peripheral area NAA. The peripheral area NAA may include the bending area BA and the second non-bending area NBA2.

The bending area BA may be bent in a virtual axis extending in the second direction DR2. When the bending area BA is bent, the second non-bending area NBA2 may face the first non-bending area NBA1. According to some embodiments, a width of the display panel DP in the second direction DR2 may be smaller in the bending area BA than in the first non-bending area NBA1.

The display pad part DP-PD may be located adjacent to an end of the second non-bending area NBA2. The signal lines SGL may extend from the first non-bending area NBA1 to the second non-bending area NBA2 via the bending area BA to be connected to the display pad part DP-PD. The flexible circuit board CF (refer to FIG. 1B) may be electrically connected to the display pad part DP-PD. The flexible circuit board CF (refer to FIG. 1B) may be attached to the display pad part DP-PD through a conductive adhesive film or the like, and thus the display panel DP and the flexible circuit board CF (refer to FIG. 1B) may be electrically connected to each other.

Referring to FIGS. 3A and 3B, in the display panel DP according to some embodiments, a circuit element layer DP-CL, a display element layer DP-OLED, and an upper insulating layer TFL on the base layer BL may be sequentially arranged. The configuration of the circuit element layer DP-CL, the display element layer DP-OLED, and the upper insulating layer TFL will be described in detail with reference to FIG. 3B.

The circuit element layer DP-CL includes at least one insulating layer and a circuit element. The circuit element includes a signal line, a driving circuit of a pixel, and the like. The circuit element layer DP-CL may be formed through forming an insulating layer, a semiconductor layer, and a conductive layer by coating, deposition, or the like, and patterning the insulating layer, the semiconductor layer, and the conductive layer by a photolithography process.

A buffer layer BFL may include a plurality of stacked inorganic layers. A semiconductor pattern is located on the buffer layer BFL. The buffer layer BFL improves a bonding force between the base layer BL and the semiconductor pattern.

The semiconductor pattern may include polysilicon. However, the inventive concept is not limited thereto, and the semiconductor pattern may include amorphous silicon or metal oxide. FIG. 3B illustrates a portion of the semiconductor pattern, and the semiconductor pattern may be further arranged in another area of the pixel PX in a plan view. The semiconductor pattern may be arranged in a specific rule over the pixels PX.

The semiconductor pattern has different electrical characteristics depending on whether the semiconductor pattern is doped. The semiconductor pattern may include a first region A1 having low doping concentration and low conductivity and second regions S1 and D1 having relatively high doping concentration and high conductivity. One second region S1 may be located on one side of the first region A1, and the other second region D1 may be located on the other side of the first region A1. The second regions S1 and D1 may be doped with an N-type dopant or a P-type dopant. A P-type transistor includes a doped region doped with a P-type dopant. The first region A1 may be a non-doped region or may be doped with a lower concentration than that of the second regions S1 and D1.

The second regions S1 and D1 substantially serve as electrodes or signal lines. The one second region S1 may correspond to a source, and the other second region D1 may be a drain, in a transistor. FIG. 3B illustrates a portion of a connection signal line SCL formed from the semiconductor pattern. According to some embodiments, the connection signal line SCL may be connected to the drain of the transistor TR in a plan view.

A first insulating layer 10 may be located on the buffer layer BFL. The first insulating layer 10 overlaps the plurality of pixels PX (refer to FIG. 3A) in common and covers the semiconductor pattern. The first insulating layer 10 may be an inorganic layer and/or an organic layer, and may have a single-layered or multi-layered structure. The first insulating layer 10 may include at least one of aluminum oxide, titanium oxide, silicon oxide, silicon oxynitride, zirconium oxide, or hafnium oxide. An insulating layer of the circuit element layer DP-CL to be described later may be an inorganic layer and/or an organic layer, and may have a single-layered or multi-layered structure, as well as the first insulating layer 10.

A gate G1 is located on the first insulating layer 10. The gate G1 may be a part of the metal pattern. The gate G1 overlaps the first region A1. In a process of doping the semiconductor pattern, the gate G1 may function as a mask.

A second insulating layer 20 may be located on the first insulating layer 10 and may cover the gate G1. The second insulating layer 20 overlaps the pixels PX (refer to FIG. 3A) in common. An upper electrode UE may be located on the second insulating layer 20. The upper electrode UE may overlap the gate G1. The upper electrode UE may include a multi-layered metal layer. According to some embodiments of the inventive concept, the upper electrode UE may be omitted.

A third insulating layer 30 may be located on the second insulating layer 20 and may cover the upper electrode UE. A first connection electrode CNE1 may be located on the third insulating layer 30. The first connection electrode CNE1 may be connected to the connection signal line SCL through a contact hole CNT-1 penetrating the first to third insulating layers 10 to 30.

A fourth insulating layer 40 may be located on the third insulating layer 30, and a fifth insulating layer 50 may be located on the fourth insulating layer 40. The fifth insulating layer 50 may be an organic layer. A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50. A sixth insulating layer 60 may be located on the fifth insulating layer 50 and may cover the second connection electrode CNE2. The sixth insulating layer 60 may be an organic layer.

An organic light emitting diode OLED may be located on the sixth insulating layer 60. A first electrode AE may be located on the sixth insulating layer 60. The first electrode AE is connected to the second connection electrode CNE2 through a contact hole CNT-3 penetrating the sixth insulating layer 60. An opening OP is defined in a pixel defining layer PDL, and the pixel defining layer PDL exposes at least a portion of the first electrode AE. The pixel defining layer PDL may be an organic layer.

As illustrated in FIG. 3B, the display area may include a light emission area PXA and a non-light emission area NPXA adjacent to the light emission area PXA. The non-light emission area NPXA may surround the light emission area PXA.

According to some embodiments, the light emission area PXA is defined to correspond to a portion of the first electrode AE exposed by the opening OP.

A hole control layer HCL may be commonly located in the light emission area PXA and the non-light emission area NPXA. The hole control layer HCL may include a hole transport layer and may further include a hole injection layer. A light emission layer EML is located on the hole control layer HCL. The light emission layer EML may be located in a region corresponding to the opening OP. That is, the light emission layer EML may be formed separately in each of the pixels PX (refer to FIG. 3A).

An electron control layer ECL may be located on the emission layer EML. The electron control layer ECL may include an electron transport layer and may further include an electron injection layer. The hole control layer HCL and the electron control layer ECL may be commonly formed in the plurality of pixels using an open mask.

A second electrode CE may be located on the electron control layer ECL. The second electrode CE has an integral shape and may be commonly located in the plurality of pixels PX (refer to FIG. 3A).

The upper insulating layer TFL may be located on the display element layer DP-OLED, and may include a plurality of thin layers. According to some embodiments, the upper insulating layer TFL may include a capping layer CPL and an encapsulation layer TFE located on the capping layer CPL. The capping layer CPL is located on the second electrode CE and is in contact with the second electrode CE. The capping layer CPL may include an organic material.

The encapsulation layer TFE may include a first inorganic layer IOL1, an organic layer OL located on the first inorganic layer IOL1, and a second inorganic layer IOL2 located on the organic layer OL. The first inorganic layer IOL1 and the second inorganic layer IOL2 protect the display element layer DP-OLED from moisture/oxygen, and the organic layer OL protects the display element layer DP-OLED from foreign substances such as dust particles.

Figure 4:
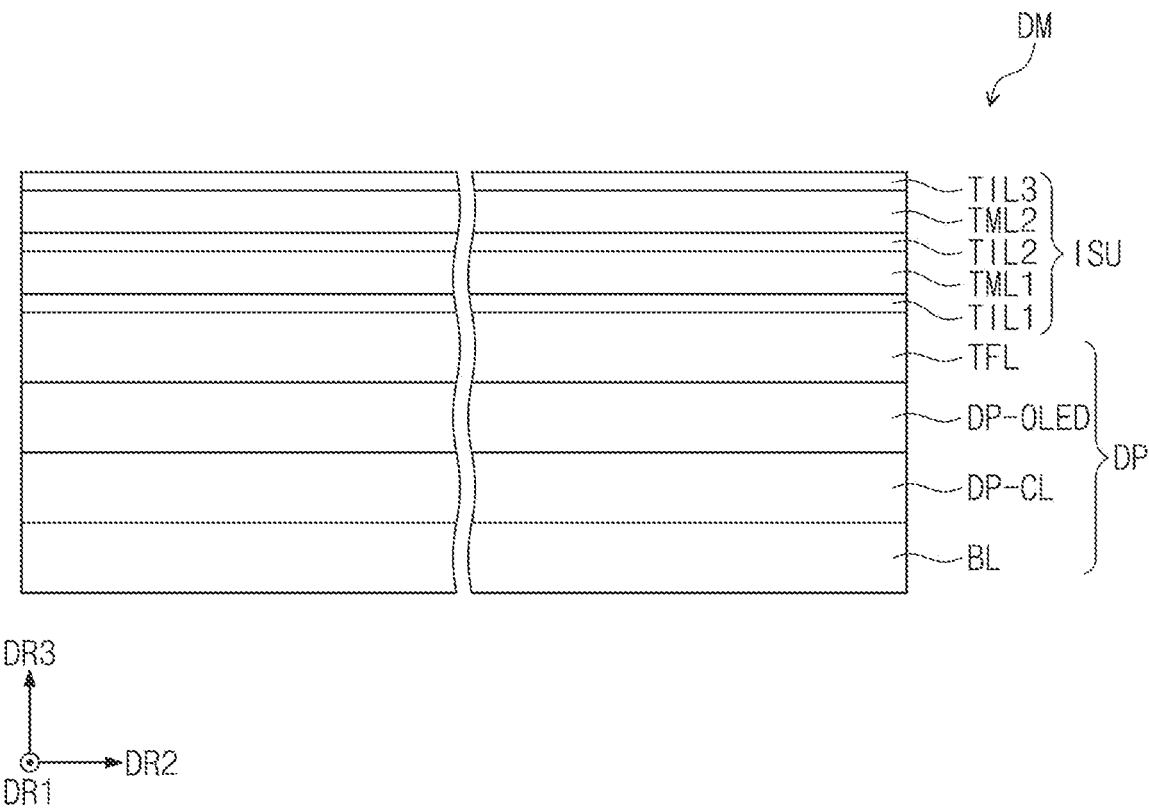
FIG. 4 is a schematic cross-sectional view of a display module according to some embodiments of the inventive concept.

FIG. 4 is a schematic cross-sectional view of a display module according to some embodiments of the inventive concept.

Referring to FIG. 4, an input sensing unit ISU may be located on an upper insulating layer TFL. The input sensing unit ISU may be located on an encapsulation layer TFE. The input sensing unit ISU includes a first sensing insulating layer TIL1, a first sensing conductive layer TML1, a second sensing insulating layer TIL2, a second sensing conductive layer TML2, and a third sensing insulating layer TIL3.

The first sensing insulating layer TIL1 may be directly located on the encapsulation layer TFE. Meanwhile, according to some embodiments of the input sensing unit ISU, the first sensing insulating layer TIL1 may be omitted.

Each of the first sensing conductive layer TML1 and the second sensing conductive layer TML2 may have a single-layered structure or a multi-layered structure. The multi-layered conductive layer may include at least two or more of a transparent conductive layer and a metal layer. The multi-layered conductive layer may include metal layers including different metals.

The first sensing conductive layer TML1 and the second sensing conductive layer TML2, which are transparent conductive layers, may include at least one of indium tin oxide (ITO), indium zinc oxide (IZO), zinc oxide (ZnO), or indium tin zinc oxide (ITZO), PEDOT, metal nanowires, or graphene. The first sensing conductive layer TML1 and the second sensing conductive layer TML2, which are metal layers, may include molybdenum, silver, titanium, copper, aluminum, or an alloy thereof. For example, each of the first sensing conductive layer TML1 and the second sensing conductive layer TML2 may have a three-layered structure including titanium/aluminum/titanium. A metal having relatively high durability and low reflectance may be applied to an outer layer of the conductive layer, and a metal having high electrical conductivity may be applied to an inner layer of the conductive layer.

Each of the first to third sensing insulating layers TIL1, TIL2, and TIL3 may include an inorganic layer or an organic layer. According to some embodiments, each of the first sensing insulating layer TIL1 and the second sensing insulating layer TIL2 may include an inorganic layer. The inorganic layer may include at least one of aluminum oxide, titanium oxide, silicon oxide, silicon oxynitride, zirconium oxide, or hafnium oxide. The third sensing insulating layer TIL3 may include an organic layer. The organic layer may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, or perylene-based resin.

Figure 5A:
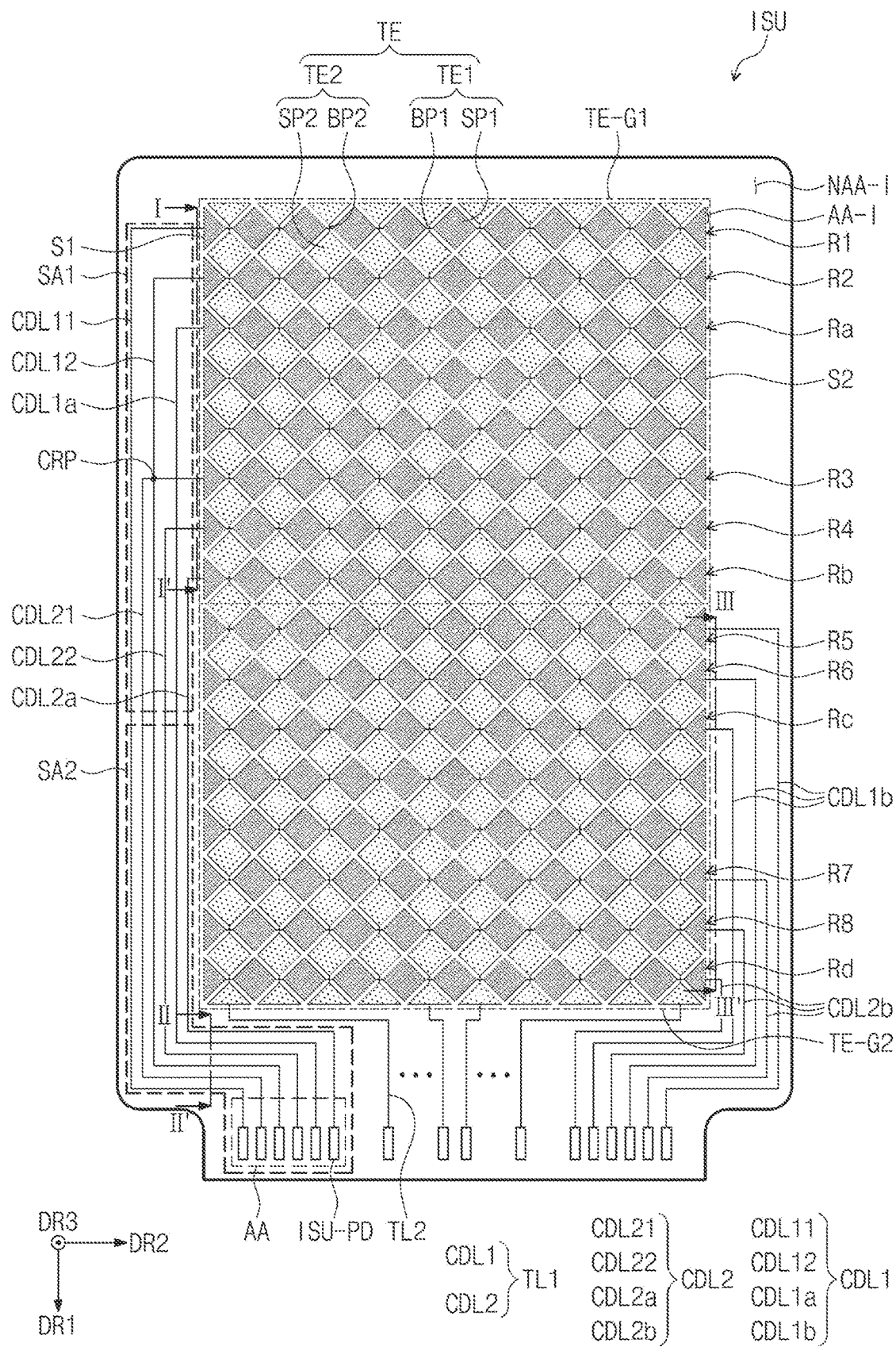
FIG. 5A is a plan view of an input sensing unit according to some embodiments of the inventive concept.
Figure 5B:
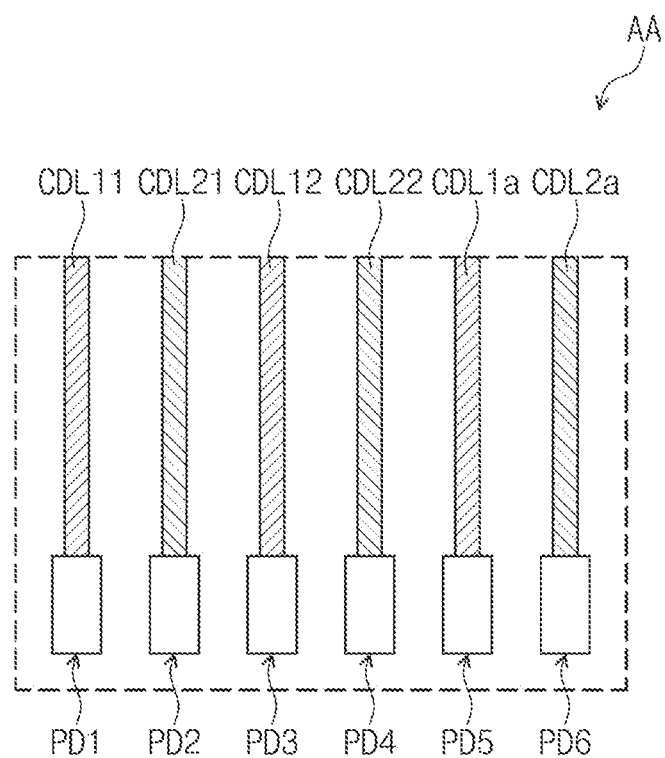
FIG. 5B is an enlarged plan view of a portion of an input sensing unit according to some embodiments of the inventive concept.
Figure 6A:
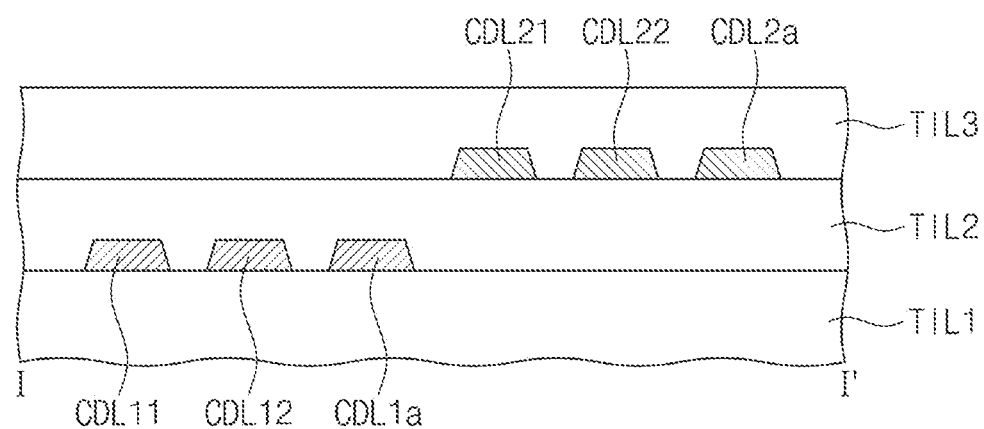
FIGS. 6A to 6C are enlarged cross-sectional views of a portion of an input sensing unit according to some embodiments of the inventive concept.
Figure 6B:
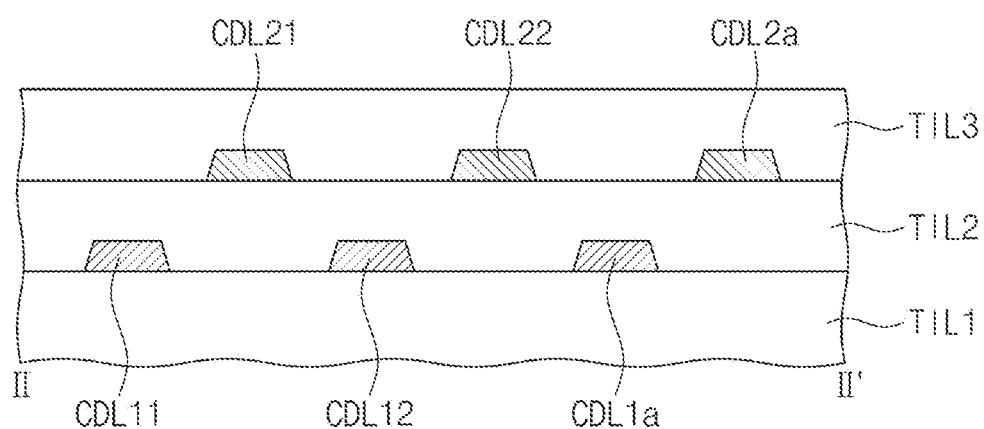
Figure 6C:
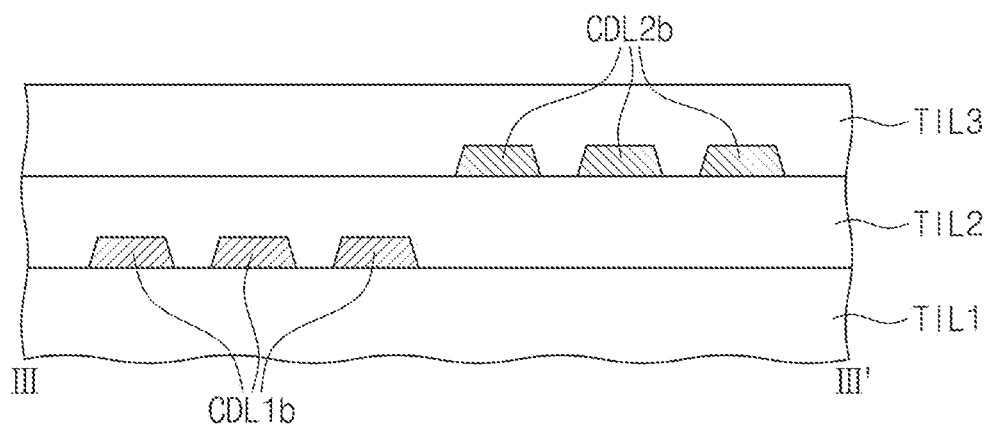

FIG. 5A is a plan view of an input sensing unit according to some embodiments of the inventive concept. FIG. 5B is an enlarged plan view of a portion of an input sensing unit according to some embodiments of the inventive concept. FIGS. 6A to 6C are enlarged cross-sectional views of a portion of an input sensing unit according to some embodiments of the inventive concept. FIG. 5B is an enlarged view of a region "AA" shown in FIG. 5A. FIG. 6A shows a cross-sectional view taken along the line I-I' in FIG. 5A. FIG. 6B shows a cross-sectional view taken along the ling II-II' in FIG. 5A. FIG. 6C shows a cross-sectional view taken along the line III-III' in FIG. 5A.

Referring to FIG. 5A, an input sensing unit ISU may be divided into an active area AA-I and a peripheral area NAA-I adjacent to the active area AA-I. The active area AA-I and the peripheral area NAA-I of the input sensing unit ISU may correspond to the active area AA (refer to FIG. 3A) and the peripheral area NAA (refer to FIG. 3A) of the display panel DP (refer to FIG. 3A), respectively.

According to some embodiments, the input sensing unit ISU may include a first non-bending area, a bending area, and a second non-bending area. Each of the first non-bending area, the bending area, and the second non-bending area of the input sensing unit ISU may correspond to the first non-bending area NBA1 (refer to FIG. 3A), the bending area BA (refer to FIG. 3A), and the second non-bending area NBA2 (refer to FIG. 3A) of the display panel DP (refer to FIG. 3A), respectively.

According to some embodiments, the input sensing unit ISU may include a plurality of sensing electrodes TE1 and TE2, a plurality of sensing wirings TL1 and TL2 respectively connected to the sensing electrodes TE1 and TE2, and an input pad part ISU-PD including a plurality of sensing pads. One end of the plurality of sensing wirings TL1 and TL2 may be connected to the plurality of sensing electrodes TE1 and TE2, and the other end thereof may be connected to the plurality of sensing pads located in the input pad part ISU-PD.

The plurality of sensing electrodes TE1 and TE2 may include a first sensing electrode TE1 and a second sensing electrode TE2.

The first sensing electrode TE1 may extend in a second direction DR2, may be provided in a plurality of rows, and may be arranged in the first direction DR1. The first sensing electrode TE1 may include first sensing patterns SP1 and first conductive patterns BP1. The first sensing patterns SP1 may be arranged in the second direction DR2. At least one first conductive pattern BP1 may be connected to two adjacent first sensing patterns SP1. According to some embodiments, the first sensing patterns SP1 and the first conductive patterns BP1 may be patterned by the same process to have an integral or integrated shape or form (e.g., as one cohesive or integrated body).

The second sensing electrodes TE2 may extend in the first direction DR1, and may be provided in plurality to be arranged in the second direction DR2. The second sensing electrode TE2 may include second sensing patterns SP2 and second conductive patterns BP2. The second sensing patterns SP2 may be arranged in the first direction DR1. At least one second conductive pattern BP2 may be located between two adjacent second sensing patterns SP2.

Meanwhile, according to some embodiments, each of the first sensing electrode TE1 and the second sensing electrode TE2 may include a plurality of conductive lines crossing each other and may have a mesh shape in which a plurality of openings are defined.

According to some embodiments, the second conductive pattern BP2 may be included in the first sensing conductive layer TML1 described with reference to FIG. 4, and the first sensing patterns SP1 and the second sensing patterns SP2, and the first conductive pattern BP1 may be included in the second sensing conductive layer TML2 described with reference to FIG. 4.

The plurality of sensing wirings TL1 and TL2 may include first sensing wirings TL1 and second sensing wirings TL2. According to some embodiments, each of the first sensing wirings TL1 may be connected to one end of the first sensing electrodes TE1. Each of the second sensing wirings TL2 may be connected to one end of the second sensing electrodes TE2. FIG. 5A illustrates that the first sensing wirings TL1 are connected to one end of the first sensing electrodes TE1 and the second sensing wirings TL2 are connected to one end of the second sensing electrodes TE2, but is not limited thereto. For example, the first sensing wirings TL1 may be connected to both one end and the other end of the first sensing electrodes TE1. The second sensing wirings TL2 may be connected to both one end and the other end of the second sensing electrodes TE2.

The input pad part ISU-PD may be located adjacent to one end of the input sensing unit ISU. For example, the input pad part ISU-PD may be located adjacent to an end of the second non-bending area. The plurality of sensing wirings TL1 and TL2 may be connected to the input pad part ISU-PD. The above-described flexible circuit board CF (refer to FIG. 1B) may be electrically connected to the input pad part ISU-PD, and the input sensing unit ISU and the flexible circuit board CF (refer to FIG. 1B) may be electrically connected to each other.

However, the inventive concept is not limited thereto, and the input pad part ISU-PD may be omitted on the input sensing unit ISU. In this case, the plurality of sensing wirings TL1 and TL2 may be connected to wirings and pads located on the display panel DP through a contact hole penetrating the first and second sensing insulating layers TIL1 and TIL2. Accordingly, the sensing electrodes TE1 and TE2 and the pixel PX (refer to FIG. 3A) may be connected to the main board MB (refer to FIG. 1B) through one flexible circuit board CF (refer to FIG. 1B).

At least some of the plurality of sensing wirings TL1 and TL2 may include a plurality of trace wirings located on different layers. According to some embodiments, the first sensing wirings TL1 may include a plurality of first trace wirings CDL1 and a plurality of second trace wirings CDL2 located on different layers. The first trace wiring CDL1 and the second trace wiring CDL2 may be located on different insulating layers. Referring to FIGS. 4 and 5A together, in the input sensing unit ISU according to some embodiments, the first trace wiring CDL1 may be included in the first sensing conductive layer TML1 and may be located on the first sensing insulating layer TIL1. The second trace wiring CDL2 may be included in the second sensing conductive layer TML2 and may be located on the second sensing insulating layer TIL2.

Meanwhile, the plurality of sensing electrodes TE1 and TE2 may be arranged in a plurality of rows and a plurality of columns. According to some embodiments, the first sensing electrodes TE1 may be arranged in a plurality of rows spaced apart from each other in the first direction DR1.

The first sensing electrodes TE1 may include a first row sensing electrode R1, a second row sensing electrode R2, a third row sensing electrode R3, and a fourth row sensing electrode R4. According to some embodiments, the first row sensing electrode R1 and the second row sensing electrode R2 may be sensing electrodes located adjacent to each other in the first direction DR1. The third row sensing electrode R3 and the fourth row sensing electrode R4 may be sensing electrodes located adjacent to each other in the first direction DR1. In this specification, the fact that two sensing electrode rows are located adjacent to each other in one direction may mean that no other sensing electrodes are located between the two sensing electrode rows in one direction. The first sensing electrodes TE1 may further include an (a)th row sensing electrode Ra located adjacent to the second row sensing electrode R2 and a (b)th row sensing electrode Rb located adjacent to the fourth row sensing electrode R4.

According to some embodiments, a plurality of first trace wirings CDL1 are connected to each of the first row sensing electrode R1 and the second row sensing electrode R2 located adjacent to each other. A plurality of second trace wirings CDL2 are connected to each of the third row sensing electrodes R3 and the fourth row sensing electrodes R4 located adjacent to each other. That is, in the input sensing unit ISU according to some embodiments, the trace wirings located on the same layer may be connected to the sensing electrode rows located adjacent to each other. The first trace wiring CDL1 may be connected to the (a)th-row sensing electrode Ra located adjacent to the second row sensing electrode R2 in the same manner as the second row sensing electrode R2. Also, the second trace wiring CDL2 may be connected to the (b)th-row sensing electrode Rb located adjacent to the fourth row sensing electrode R4, in the same manner as the fourth row sensing electrode R4.

The plurality of first trace wirings CDL1 may include a (1-1)st trace wiring CDL11 and a (1-2)nd trace wiring CDL12. The first trace wiring CDL1 may further include a (1-a)th trace wiring CDL1a. The (1-1)st trace wiring CDL11 may be connected to the first row sensing electrode R1, and the (1-2)nd trace wiring CDL12 may be connected to the second row sensing electrode R2. The (1-a)th trace wiring CDL1a may be connected to the (a)th-row sensing electrode Ra.

The plurality of second trace wirings CDL2 may include a (2-1)st trace wiring CDL21 and a (2-2)nd trace wiring CDL22. The second trace wiring CDL2 may further include a (2-a)th trace wiring CDL2a. The (2-1)st trace wiring CDL21 may be connected to the third row sensing electrode R3, and the (2-2)nd trace wiring CDL22 may be connected to the fourth row sensing electrode R4. The (2-a)th trace wiring CDL2a may be connected to the (b)th-row sensing electrode Rb.

Meanwhile, the plurality of sensing electrodes TE1 and TE2 may include a first group sensing electrodes TE-G1 and a second group sensing electrodes TE-G2 sequentially arranged in the first direction DR1. The first group sensing electrode TE-G1 may include the described-above first row sensing electrode R1, second row sensing electrode R2, third row sensing electrode R3, fourth row sensing electrode R4, (a)th-row sensing electrode Ra, and (b)th-row sensing electrode Rb. The second group sensing electrodes TE-G2 may include a fifth row sensing electrode R5, a sixth row sensing electrode R6, a seventh row sensing electrode R7, and an eighth row sensing electrode R8.

According to some embodiments, the fifth row sensing electrode R5 and the sixth row sensing electrode R6 may be sensing electrodes located adjacent to each other in the first direction DR1. The seventh row sensing electrode R7 and the eighth row sensing electrode R8 may be sensing electrodes located adjacent to each other in the first direction DR1. The second group sensing electrodes TE-G2 may further include a (c)th row sensing electrode Rc located adjacent to the sixth row sensing electrode R6 and a (d)th row sensing electrode Rd located adjacent to the eighth row sensing electrode R8. Meanwhile, the fifth row sensing electrode R5 and the sixth row sensing electrode R6 may be sensing electrode rows located adjacent to the first group sensing electrodes TE-G1, compared to the seventh row sensing electrode R7 and the eighth row sensing electrode R8.

According to some embodiments, the plurality of first trace wirings CDL1 may be connected to each of the fifth row sensing electrodes R5 and the sixth row sensing electrodes R6 located adjacent to each other. The first trace wiring CDL1 may be connected to the (c)th row sensing electrode Rc located adjacent to the sixth row sensing electrode R6, in the same manner as the sixth row sensing electrode R6. Each of a plurality of (1-b)th trace wirings CDL1b included in the plurality of first trace wirings CDL1 may be connected to the fifth row sensing electrode R5, the sixth row sensing electrode R6, and the (c)th row sensing electrode Rc, respectively.

According to some embodiments, the plurality of second trace wirings CDL2 may be connected to each of the seventh row sensing electrodes R7 and the eighth row sensing electrodes R8 located adjacent to each other. The second trace wiring CDL2 may also be connected to the (d)th row sensing electrode Rd located adjacent to the eighth row sensing electrode R8, in the same manner as the eighth row sensing electrode R8. A plurality of (2-b)th trace wirings CDL2b included in the plurality of second trace wirings CDL2 may be connected to the seventh row sensing electrode R7, the eighth row sensing electrode R8, and the d row sensing electrode Rd, respectively.

Each of the first group sensing electrode TE-G1 and the second group sensing electrode TE-G2 may include a first side S1 and a second side S2, which are spaced apart from each other in the second direction DR2. The first group sensing electrode TE-G1 and the second group sensing electrode TE-G2 may have different sides to which the first sensing wirings TL1 are connected. As shown in FIG. 5A, the first sensing wirings TL1 in the first group sensing electrode TE-G1 may be connected to the first side S1, and the first sensing wirings TL1 in the second group sensing electrode TE-G2 may be connected to the second side S2. However, embodiments according to the inventive concept is not limited thereto, and in the input sensing unit ISU according to some embodiments of the inventive concept, the sides to which the first sensing wirings TL1 are connected in the first group sensing electrode TE-G1 and the second group sensing electrode TE-G2 may be the same. Alternatively, as shown in FIG. 5A, the first sensing wirings TL1 in the first group sensing electrode TE-G1 may be connected to the second side S2, and the first sensing wirings TL1 in the second group sensing electrode TE-G2 may be connected to the first side S1.

Meanwhile, an upper wiring area SA1 including a portion where the plurality of first sensing wirings TL1 are connected to the plurality of first sensing electrodes TE1 and a lower wiring area SA2 including a portion where the plurality of first sensing wirings TL1 are connected to the input pad part ISU-PD including the plurality of sensing pads may be defined in the input sensing unit ISU.

In the upper wiring area SA1, a p portion of the first trace wiring CDL1 and a portion of the second trace wiring CDL2 may cross each other in a plan view. That is, an intersection point CRP at which the portion of the first trace wiring CDL1 and the portion of the second trace wiring CDL2 intersect may be provided in the upper wiring area SA1. That is, a part in which the portion of the first trace wiring CDL1 and the portion of the second trace wiring CDL2 overlap may be provided in the upper wiring area SA1. According to some embodiments as shown, for example, with respect to FIG. 5A, the intersection point CRP between the (1-2)nd trace wiring CDL12 and the (2-1)st trace wiring CDL21 may be provided in the upper wiring area SA1, but embodiments according to the present disclosure are not limited thereto.

In the lower wiring area SA2, each of the first trace wiring CDL1 and the second trace wiring CDL2 may be alternately arranged with each other. That is, in the lower wiring area SA2, the second trace wiring CDL2 may be located between the plurality of first trace wirings CDL1, and the first trace wiring CDL1 may be located between the plurality of second trace wirings CDL2. In the lower wiring area SA2, the first trace wiring CDL1 and the second trace wiring CDL2 may not overlap each other in a plan view. As shown in FIG. 5A, the (2-1)st trace wiring CDL21 may be located between the (1-1)st trace wiring CDL11 and the (1-2)nd trace wiring CDL12, and the (2-1)st trace wiring CDL21 may be located between the (2-1)st trace line CDL21 and the (2-2)nd trace line CDL22. The (2-2)nd trace wiring CDL22 may be located between the (1-2)nd trace wiring CDL12 and a (1-a)th trace wiring CDL1a. The (1-a)th trace wiring CDL1a may be located between the (2-2)nd trace wiring CDL22 and a (2-a)th trace wiring CDL2a.

Referring to FIGS. 5A and 5B together, a plurality of sensing pads PD1, PD2, PD3, PD4, PD5, and PD6 may be located on the input pad part ISU-PD. The plurality of sensing pads PD1, PD2, PD3, PD4, PD5, and PD6 may be sequentially arranged in one direction, for example, the second direction DR2. The plurality of sensing pads PD1, PD2, PD3, PD4, PD5, and PD6 may include a first sensing pad PD1, a second sensing pad PD2, a third sensing pad PD3, a fourth sensing pad PD4, a fifth sensing pad PD5, and a sixth sensing pad PD6 sequentially arranged in the second direction DR2.

Different trace wirings may be connected to two adjacent sensing pads among the plurality of sensing pads PD1, PD2, PD3, PD4, PD5, and PD6. Trace wirings located on different layers may be connected to two adjacent sensing pads among the plurality of sensing pads PD1, PD2, PD3, PD4, PD5, and PD6. According to some embodiments, the (1-1)st trace wiring CDL11 of the first trace wiring CDL1 may be connected to the first sensing pad PD1, and the (2-1)st trace wiring CDL21 of the second trace wiring CDL2 may be connected to the second sensing pad PD2. The (1-2)nd trace wiring CDL12 of the first trace wiring CDL1 may be connected to the third sensing pad PD3, the (2-2)nd trace wiring CDL22 of the second trace wiring CDL2 may be connected to the fourth sensing pad PD4, the (1-a)th trace wiring CDL1a of the first trace wirings CDL1 may be connected to the fifth sensing pad PD5, and the (2-a)th trace wiring CDL2a of the first trace wirings CDL1 may be connected to the sixth sensing pad PD6. The trace wirings located on different layers may be connected to the two adjacent sensing pads, and thus the first trace wiring CDL1 and the second trace wiring CDL2 may be alternately arranged in the lower wiring area SA2 as described above.

Referring to FIGS. 5A, 6A, and 6C together, each of the plurality of first trace wirings CDL1 and the plurality of second trace wirings CDL2 may be located on different insulating layers. In the input sensing unit ISU according to some embodiments, the first trace wiring CDL1 may be included in the first sensing conductive layer TML1 and may be located on the first sensing insulating layer TIL1. The second trace wiring CDL2 may be included in the second sensing conductive layer TML2 and may be located on the second sensing insulating layer TIL2.

At least a portion of each of the plurality of first trace wirings CDL1 located on the first sensing insulating layer TIL1 may be located adjacent to each other in a plan view. In the upper wiring area SA1 including portions where the plurality of first trace wirings CDL1 are connected to the plurality of first sensing electrodes TE1, a portion of each of the plurality of first trace wirings CDL1 may be located adjacent to each other in a plan view. As shown in FIGS. 5A and 6A, each of the (1-1)st trace wiring CDL11 connected to the first row sensing electrode R1 and the (1-2)nd trace wiring CDL12 connected to the second row sensing electrode R2, and the (1-a)th trace wiring CDL1a connected to the (a)th-row sensing electrode Ra may be located on the first sensing insulating layer TIL1 and may be located adjacent to each other in a plan view. That is, the second trace wiring CDL2 may not be located between the (1-1)st trace wiring CDL11, the (1-2)nd trace wiring CDL12, and the (1-a)th trace wiring CDL1a.

At least a portion of each of the plurality of second trace wirings CDL2 located on the second sensing insulating layer TIL2 may be located adjacent to each other in a plan view. In the upper wiring area SA1 including portions where the plurality of second trace wirings CDL2 are connected to the plurality of first sensing electrodes TE1, a portion of each of the plurality of second trace wirings CDL2 may be located adjacent to each other in a plan view. As shown in FIGS. 5A and 6A, each of the (2-1)st trace wiring CDL21 connected to the third row sensing electrode R3, the (2-2)nd trace wiring CDL22 connected to the fourth row sensing electrode R4, and the (2-a)th trace wiring CDL2a connected to the sensing electrode Rb in the (b)th-row may be located on the second sensing insulating layer TIL2 and may be located adjacent to each other in a plan view. That is, the first trace wiring CDL1 may not be located between the (2-1)st trace wiring CDL21, the (2-2)nd trace wiring CDL22, and the (2-a)th trace wiring CDL2a.

As shown in FIGS. 5A and 6C, the (1-b)th trace wiring CDL1b connected to each of the fifth row sensing electrode R5, the sixth row sensing electrode R6, and the (c)th row sensing electrode Rc may be located on the first sensing insulating layer TIL1 and may be located adjacent to each other in a plan view. That is, the second trace wiring CDL2 may not be located between the plurality of (1-b)th trace wirings CDL1b.

As shown in FIGS. 5A and 6C, the (2-b)th trace wiring CDL2b connected to each of the seventh row sensing electrode R7, the eighth row sensing electrode R8, and the (d)th row sensing electrode Rd may be located on the second sensing insulating layer TIL2 and may be located adjacent to each other in a plan view. That is, the first trace wiring CDL1 may not be located between the plurality of (2-b)th trace wirings CDL2b.

Referring to FIGS. 5A and 6B together, in the lower wiring area SA2 including a portion where the trace wirings CDL1 and CDL2 are connected to the plurality of sensing pads included in the input pad part ISU-PD, each of the first trace wiring CDL1 and the second trace wiring CDL2 may be alternately arranged with each other. That is, as shown in FIG. 6B, the (1-1)st trace wiring CDL11, the (2-1)st trace wiring CDL21, the (1-2)nd trace wiring CDL12, the (2-2)nd trace wiring CDL22, the (1-a)th trace wiring CDL1a, and the (2-a)th trace wiring CDL2a may be sequentially arranged in the first direction DR1 defining the cross sectional view shown in FIG. 6B.

In the input sensing unit included in the display device according to some embodiments, the lower wiring area including the portion in which the plurality of sensing wirings are connected to the plurality of sensing pads is defined, and the first trace wiring and the second trace wiring arranged on different layers have a structure in which they are alternately arranged with each other in the lower wiring area. That is, the first trace wiring and the second trace wiring located on different layers in the lower wiring area have a structure in which they do not overlap each other.

When the first trace wiring and the second trace wiring are located on the same layer, a space required between the first trace wiring and the second trace wiring structure may increase, and a wider area for forming a wiring may be required. In the input sensing unit according to some embodiments of the inventive concept, using a structure in which the first trace wiring and the second trace wiring located on different layers are alternately arranged with each other, the required space between the wirings may be reduced, and thus the area of the region for forming the wirings may be reduced. Accordingly, a dead space of the display device including the input sensing unit may be reduced.

Meanwhile, when the first trace wiring and the second trace wiring have the structure in which the first trace wiring and the second trace wiring alternate with each other, like in the input sensing unit according to some embodiments, an error occurring in the first trace wiring and an error occurring in the second trace wiring may be applied only to specific wirings. Accordingly, a change in a mutual capacitance value due to an etching error may also be applied only to specific wirings, and thus a deviation in the mutual capacitance value between the wirings may occur.

To solve the problem in the input sensing unit included in the display device according to some embodiments, the upper wiring area including the portion where the plurality of sensing wirings are connected to the plurality of sensing electrodes has the structure in which some of the trace wirings located on the same layer are located adjacent to each other, unlike the lower wiring area. That is, the upper wiring area may have the structure in which at least some of the plurality of first trace wirings are respectively connected to the adjacent sensing electrode rows located adjacent to each other and are located adjacent to each other in a plan view, and at least some of the plurality of second trace wirings are connected to the sensing electrode rows located adjacent to each other and are located adjacent to each other in a plan view. Accordingly, although a difference due to an error occurring in each of the first trace wiring and the second trace wiring occurs, the same type of trace wiring may be connected to the adjacent sensing electrode row, and thus a deviation of mutual capacitance values between the wirings may be reduced. Accordingly, deterioration of sensing characteristics of the input sensing unit may be prevented or reduced, and reliability of the display device including the input sensing unit according to some embodiments may be improved.

Figure 7:
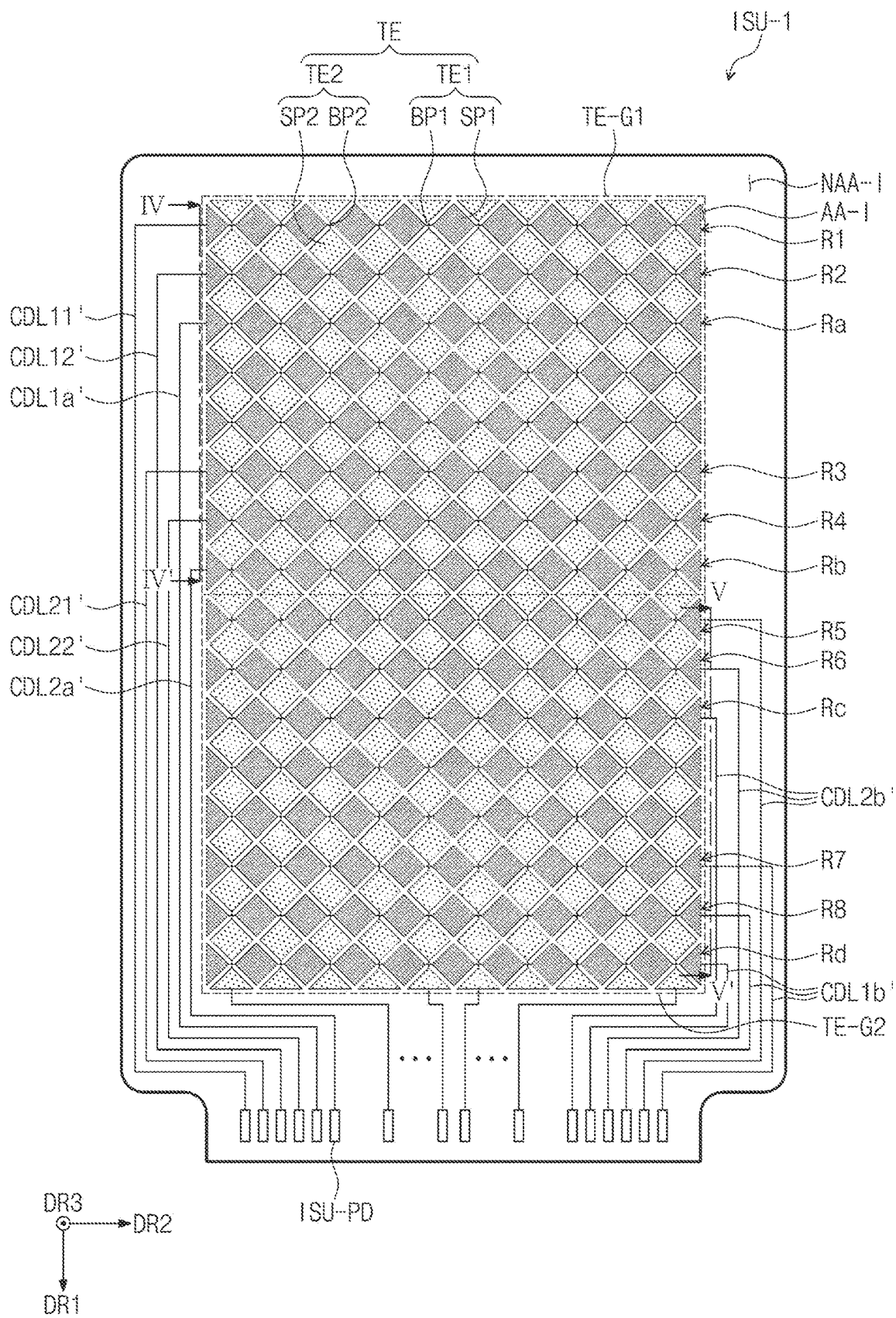
FIG. 7 is a plan view of an input sensing unit according to some embodiments of the inventive concept.
Figure 8A:
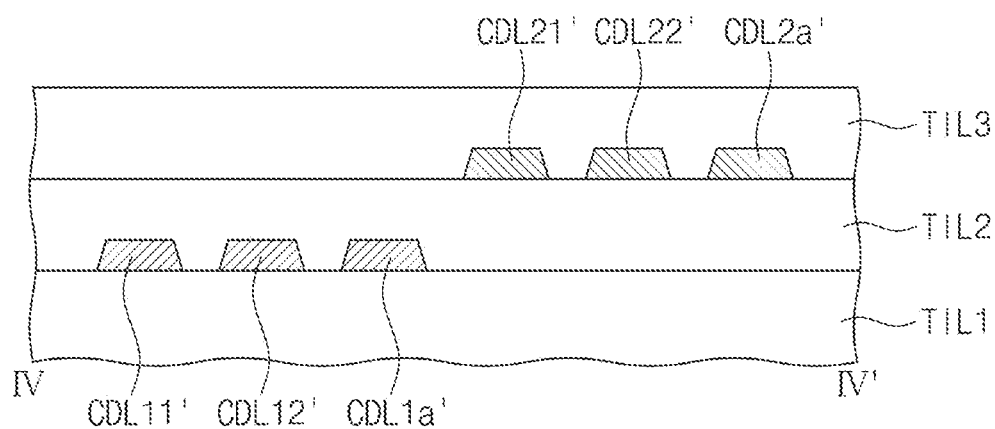
FIGS. 8A and 8B are enlarged cross-sectional views of a portion of an input sensing unit according to some embodiments of the inventive concept.
Figure 8B:
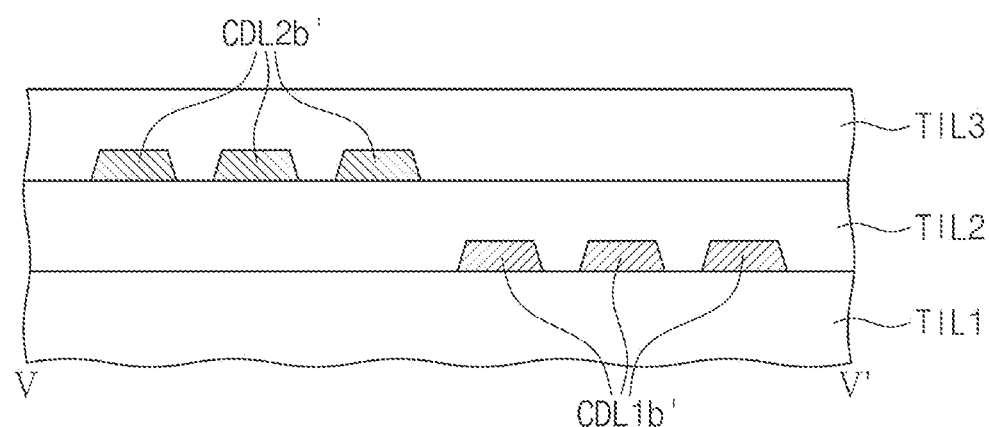

FIG. 7 is a plan view of an input sensing unit according to some embodiments of the inventive concept. FIGS. 8A and 8B are enlarged cross-sectional views of a portion of an input sensing unit according to some embodiments of the inventive concept. FIG. 8A shows a cross-sectional view taken along the line IV-IV' shown in FIG. 7. FIG. 8B shows a cross-sectional view taken along the line V-V' shown in FIG. 7. FIGS. 7, 8A, and 8B illustrate an input sensing unit ISU-1 of some embodiments, which may be different from the input sensing unit ISU of embodiments shown with respect to FIG. 5A or the like. Hereinafter, in describing the input sensing unit ISU-1 according to some embodiments with reference to FIGS. 7, 8A and 8B, the same reference numerals are given to the same components as those described above, and some detailed descriptions may be omitted.

Referring to FIGS. 7, 8A, and 8B, in an input sensing unit ISU-1 according to some embodiments, a connection order of the first trace wiring and the second trace wiring connected to the first group sensing electrode TE-G1, and a connection order of the first trace wiring and the second trace wiring connected to the second group sensing electrode TE-G2 may be different.

In detail, in the first group sensing electrode TE-G1, the first row sensing electrode R1, the second row sensing electrode R2, and the (a)th-row sensing electrode Ra, which are located adjacent to each other, may be connected to a plurality of first trace wirings CDL11', CDL12', and CDL1a', respectively, and the third row sensing electrodes R3, the fourth row sensing electrodes R4, and the (b)th-row sensing electrodes Rb, which are located adjacent to each other, may be connected to a plurality of second trace lines CDL21', CDL22', and CDL2a', respectively. That is, the first trace wiring may be connected to each of the first row sensing electrode R1, the second row sensing electrode R2, and the (a)th-row sensing electrode Ra, which are located above in the first direction DR1, and the plurality of second trace wiring may be connected to each of the third row sensing electrode R3, the fourth row sensing electrode R4, and the (b)th-row sensing electrode Rb, which are located below in the first direction DR1.

Unlike in the first group sensing electrode TE-G1, in the second group sensing electrode TE-G2, a plurality of second trace wiring CDL2b' may be connected to each of the fifth row sensing electrode R5, the sixth row sensing electrode R6, and the (c)th row sensing electrode Rc, which are closer to the first group sensing electrode TE-G1, and a plurality of first trace wiring CDL1b' may be connected to each of the seventh row sensing electrode R7, the eighth row sensing electrode R8, and the (d)th row sensing electrode Rd, which are far from the first group sensing electrode TE-G1. That is, the second trace wiring may be connected to each of the fifth row sensing electrode R5, the sixth row sensing electrode R6, and the (c)th row sensing electrode Rc, which are located above in the first direction DR1, and the plurality of first trace wirings may be connected to each of the seventh row sensing electrode R7, the eighth row sensing electrode R8, and the (d)th row sensing electrode Rd, which are located below in the first direction DR1.

Figure 9:
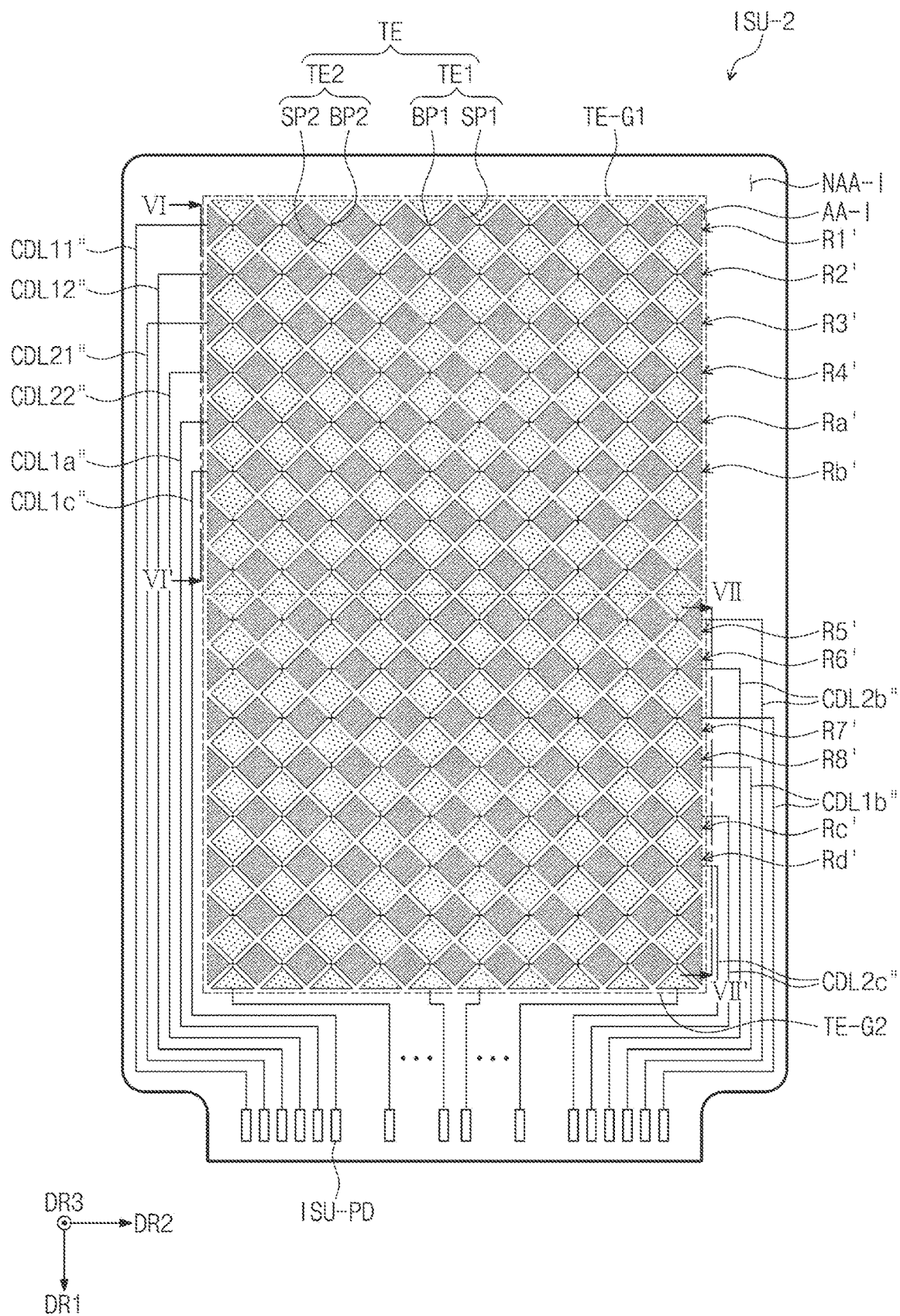
FIG. 9 is a plan view of an input sensing unit according to some embodiments of the inventive concept.
Figure 10A:
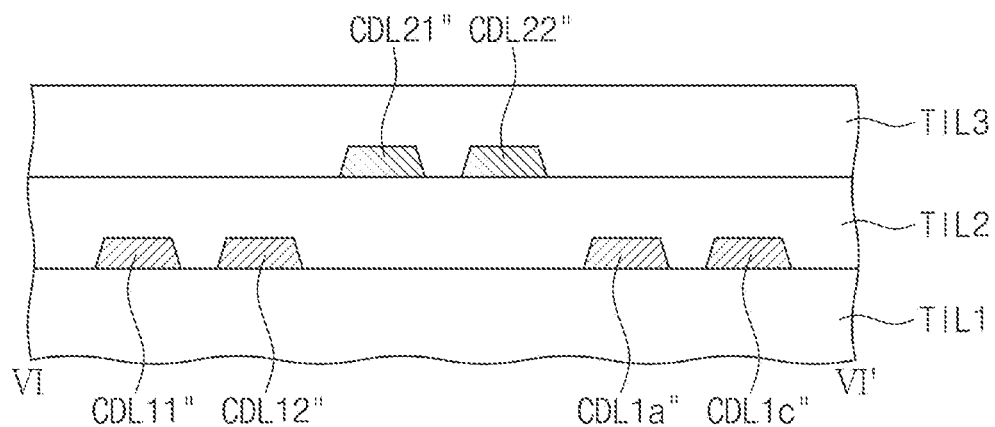
FIGS. 10A and 10B are enlarged cross-sectional views of a portion of an input sensing unit according to some embodiments of the inventive concept.
Figure 10B:
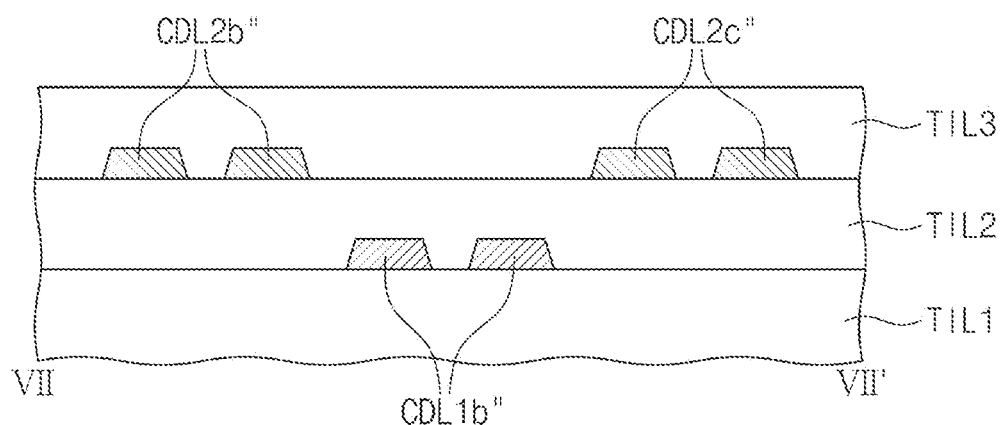

FIG. 9 is a plan view of an input sensing unit according to some embodiments of the inventive concept. FIGS. 10A and 10B are enlarged cross-sectional views of a portion of an input sensing unit according to some embodiments of the inventive concept. FIG. 10A is a cross-sectional view taken along the line VI-VI' shown in FIG. 9. FIG. 10B shows a cross-sectional view taken along the line VII-VII' shown in FIG. 9. FIGS. 9, 10A, and 10B illustrate an input sensing unit ISU-2 according to some embodiments different from the input sensing unit ISU shown in FIG. 5A and the like. Hereinafter, in describing the input sensing unit ISU-2 according to some embodiments with reference to FIGS. 9, 10A, and 10B, the same reference numerals are given to the same components as those described above, and detailed descriptions are omitted.

Referring to FIGS. 9, 10A, and 10B together, in an input sensing unit ISU-2 according to some embodiments, the first trace wiring and the second trace wiring may be connected to an adjacent row, and the same-layer wiring structure connected to the adjacent row may be alternately arranged by a unit.

Referring to FIGS. 9, 10A, and 10B together, in an input sensing unit ISU-2 according to some embodiments, the first trace wiring and the second trace wiring may be connected to an adjacent row, and the same-layer wiring structure connected to the adjacent row may be alternately arranged as a unit.

In detail, in the first group sensing electrode TE-G1, first trace wirings CDL11" and CDL12" may be connected to each of a first row sensing electrode R1' and a second row sensing electrode R2' located adjacent to each other, and second trace wirings CDL21" and CDL22" may be connected to each of a third row sensing electrode R3' and a fourth row sensing electrode R4' located adjacent to each other. Then, the first trace wirings CDL1a" and CDL1c" may be connected again to each of an (a)th-row sensing electrodes Ra' and a (b)th-row sensing electrodes Rb' located adjacent to the fourth row sensing electrodes R4'.

In the second group sensing electrodes TE-G2, a second trace wiring CDL2b" may be connected to each of a fifth row sensing electrode R5' and a sixth row sensing electrode R6' located adjacent to each other, and a first trace wiring CDL1b" may be connected to each of a seventh row sensing electrode R7' and an eighth row sensing electrode R8' located adjacent to each other. Then, the second trace wiring CDL2c" may be connected again to each of a (c)th row sensing electrode Rc' and a (d)th row sensing electrode Rd located adjacent to the eighth row sensing electrode R8'.

Figure 11:
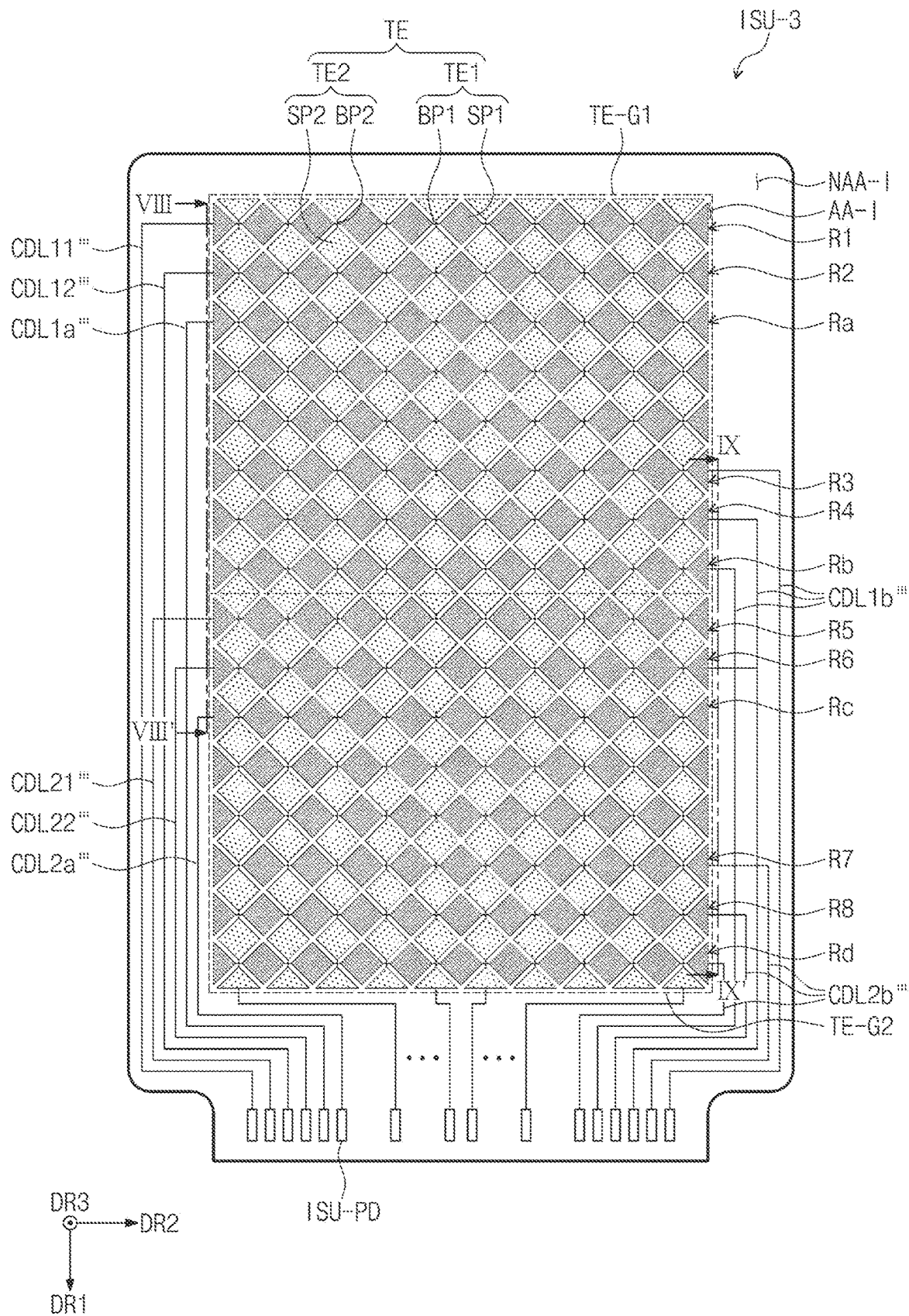
FIG. 11 is a plan view of an input sensing unit according to some embodiments of the inventive concept.
Figure 12A:
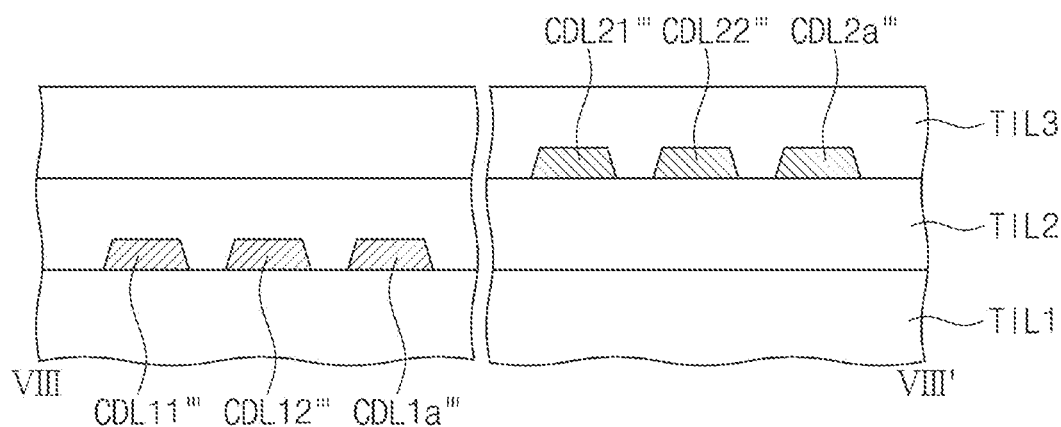
FIGS. 12A and 12B are enlarged cross-sectional views of a portion of an input sensing unit according to some embodiments of the inventive concept.
Figure 12B:
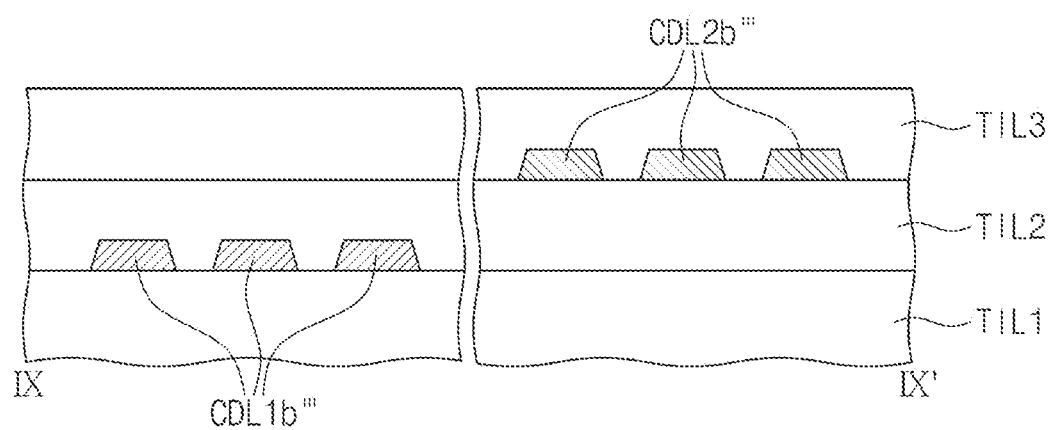

FIG. 11 is a plan view of an input sensing unit according to some embodiments of the inventive concept. FIGS. 12A and 12B are enlarged cross-sectional views of a portion of an input sensing unit according to some embodiments of the inventive concept. FIG. 12A shows a cross-sectional taken along the line VII-VIII' shown in FIG. 11. FIG. 12B shows a cross-sectional view taken along the line IX-IX' shown in FIG. 11. FIGS. 11, 12A and 12B illustrate an input sensing unit ISU-3 of some embodiments that are different from the input sensing unit ISU of some embodiments shown in FIG. 5A and the like. Hereinafter, in describing the input sensing unit ISU-3 according to some embodiments with reference to FIGS. 11, 12A, and 12B, the same reference numerals are given to the same components as those described above, and some detailed descriptions may be omitted.

Referring to FIGS. 11, 12A, and 12B, an input sensing unit ISU-3 according to some embodiments may have a structure in which the first trace wiring is connected to the first group sensing electrode TE-G1, and the second trace wiring is connected to the second group sensing electrode TE-G2.

In detail, in the first group sensing electrode TE-G1, a plurality of first trace wirings CDL11''', CDL12''', and CDL1a''' may be connected to each of the first row sensing electrode R1, the second row sensing electrode R2, and the (a)th-row sensing electrode Ra located adjacent to each other, and a plurality of first trace wirings CDL1b'''' may also be connected to each of the third row sensing electrode R3, the fourth row sensing electrode R4, and the (b)th-row sensing electrode Rb located adjacent to each other. In the second group sensing electrodes TE-G2, a plurality of second trace wirings CDL21''', CDL22''', and CDL2a''' may connected to each of the fifth row sensing electrode R5, the sixth row sensing electrode R6, and the (c)th row sensing electrode Rc located adjacent to each other, and a plurality of second trace lines CDL2b''' may be connected to each of the seventh row sensing electrode R7, the eighth row sensing electrode R8, and the (d)th row sensing electrode Rd located adjacent to each other.

Meanwhile, among the row sensing electrodes to which the plurality of first trace wirings CDL11''', CDL12''', CDL1a''', and CDL1b''' are connected, the plurality of first trace wirings CDL11''', CDL12''', and CDL1a''' may be connected to a left side of each of the first row sensing electrode R1, the second row sensing electrode R2, and the (a)th row sensing electrode Ra to extend downward, and the plurality of first trace wirings CDL1b''' may be connected to a right side of each of the third row sensing electrode R3, the fourth row sensing electrode R4, and the (b)th-row sensing electrode Rb to extend downward. In addition, among the row sensing electrodes to which the plurality of second trace wirings CDL21''', CDL22''', CDL2a''', and CDL2b''' are connected, the plurality of second trace wirings CDL21''', CDL22''', and CDL2a''' may be connected to a left side of each of the fifth row sensing electrode R5, the sixth row sensing electrode R6, and the (c)th row sensing electrode Rc to extend downward, and the plurality of second trace wirings CDL2b''' may be connected to a right side of each of the seventh row sensing electrode R7, the eighth row sensing electrode R8, and the (d)th row sensing electrode Rd to extend downward. Accordingly, the first trace wirings CDL11''', CDL12''', CDL1a''', and CDL1b''' may be connected to the first group sensing electrode TE-G1, and the second trace wirings CDL21''', CDL22''', CDL2a''', and CDL2b''' may be connected to the second group sensing electrode TE-G2, whereas, in the lower wiring area SA2 (FIG. 5A), the first trace wirings CDL11''' CDL12''', CDL1a''', and CDL1b''' and the second trace wirings CDL21''', CDL22''', CDL2a''', and CDL2b''' may be alternately arranged with each other.

In a display device according to some embodiments of the inventive concept, a deviation of mutual capacitance values between the wirings may be reduced. Accordingly, deterioration of sensing characteristics of the input sensing unit may be prevented or reduced, and reliability of the display device including the input sensing unit according to some embodiments may be improved.

While embodiments are described above, a person skilled in the art may understand that many modifications and variations are made without departing from the spirit and scope of the inventive concept defined in the following claims. Accordingly, the example embodiments of the inventive concept should be considered in all respects as illustrative and not restrictive, with the spirit and scope of the inventive concept being indicated by the appended claims, and their equivalents.

What is claimed is:

1. A display device comprising:
   a display panel having a display area and a non-display area; and
   an input sensing unit on the display panel,
   wherein the input sensing unit includes:
   a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes,
   wherein the plurality of sensing wirings includes a plurality of first trace wirings and a plurality of second trace wirings on different layers,
   wherein the plurality of sensing electrodes includes a plurality of row sensing electrodes, and the plurality of row sensing electrodes includes a first row sensing electrode and a second row sensing electrode adjacent to each other in a first direction, and a third row sensing electrode and a fourth row sensing electrode adjacent to each other in the first direction,
   wherein no other sensing row sensing electrodes are located between the first row sensing electrode and the second row sensing electrode in the first direction, and no other sensing row sensing electrodes are located between the third row sensing electrode and the fourth row sensing electrode in the first direction,
   wherein the plurality of first trace wirings are connected to each of the first row sensing electrode and the second row sensing electrode, P
   wherein the plurality of second trace wirings are connected to each of the third row sensing electrode and the fourth row sensing electrode.

2. The display device of claim 1, wherein each of the plurality of first trace wirings is connected to a first sensing pad among the plurality of sensing pads, and
   wherein each of the plurality of second trace wirings is connected to a second sensing pad adjacent to the first sensing pad among the plurality of sensing pads.

3. The display device of claim 1, wherein the input sensing unit includes:
   a first sensing insulating layer directly on the display panel;
   a second sensing insulating layer on the first sensing insulating layer; and
   a third sensing insulating layer on the second sensing insulating layer,
   wherein the plurality of first trace wirings are on the first sensing insulating layer, and
   wherein the plurality of second trace wirings are on the second sensing insulating layer.

4. The display device of claim 1, wherein the display panel includes:
   a base layer;
   a circuit element layer on the base layer and including a plurality of insulating layers;
   a display element layer on the circuit element layer and including a pixel defining layer and a light emitting element; and
   an encapsulation layer on the display element layer and covering the light emitting element, and
   wherein the input sensing unit is directly on the encapsulation layer.

5. The display device of claim 1, wherein the plurality of first trace wirings includes a (1-1)st trace wiring connected to the first row sensing electrode, and a (1-2)nd trace wiring connected to the second row sensing electrode, and
   wherein the plurality of second trace wirings includes a (2-1)st trace wiring connected to the third row sensing electrode, and a (2-2)nd trace wiring connected to the fourth row sensing electrode.

6. The display device of claim 5, wherein the plurality of sensing pads includes a first sensing pad, a second sensing pad, a third sensing pad, and a fourth sensing pad sequentially arranged along one direction,
   wherein the (1-1)st trace wiring is connected to the first sensing pad, wherein the (2-1)st trace wiring is connected to the second sensing pad,
wherein the (1-2)nd trace wiring is connected to the third sensing pad, and
wherein the (2-2)nd trace wiring is connected to the fourth sensing pad.

7. The display device of claim 1, wherein the plurality of sensing electrodes includes:
a first group sensing electrode including the first row sensing electrode, the second row sensing electrode, the third row sensing electrode, and the fourth row sensing electrode; and
a second group sensing electrode spaced apart from the first group sensing electrode in the first direction and including a fifth row sensing electrode and a sixth row sensing electrode adjacent to each other in the first direction, and a seventh row sensing electrode and an eighth row sensing electrode adjacent to each other in the first direction.

8. The display device of claim 7, wherein each of the first group sensing electrode and the second group sensing electrode includes a first side and a second side spaced apart from each other in a second direction intersecting the first direction, and
wherein the plurality of sensing wirings are connected to the first side of the first group sensing electrode and connected to the second side of the second group sensing electrode.

9. The display device of claim 7, wherein the fifth row sensing electrode and the sixth row sensing electrode are adjacent to the first group sensing electrode, compared to the seventh row sensing electrode and the eighth row sensing electrode,
wherein the plurality of first trace wirings are connected to the fifth row sensing electrode and the sixth row sensing electrode, and
wherein the plurality of second trace wirings are connected to the seventh row sensing electrode and the eighth row sensing electrode.

10. The display device of claim 7, wherein the fifth row sensing electrode and the sixth row sensing electrode are adjacent to the first group sensing electrode, compared to the seventh row sensing electrode and the eighth row sensing electrode,
wherein the plurality of second trace wirings are connected to the fifth row sensing electrode and the sixth row sensing electrode, and
wherein the plurality of first trace wirings are connected to the seventh row sensing electrode and the eighth row sensing electrode.

11. The display device of claim 1, wherein the input sensing unit includes a lower wiring area including a portion in which the plurality of sensing wirings are connected to the plurality of sensing pads, and
wherein, in the lower wiring area, the plurality of first trace wirings and the plurality of second trace wirings are alternately arranged with each other.

12. The display device of claim 11, wherein, in the lower wiring area, the plurality of first trace wirings and the plurality of second trace wirings do not overlap in a plan view.

13. The display device of claim 1, wherein the input sensing unit includes an upper wiring area including a portion in which the plurality of sensing wirings are connected to the plurality of sensing electrodes, and
wherein, in the upper wiring area, some of the plurality of first trace wirings and the plurality of second trace wirings cross each other.

14. The display device of claim 13, wherein, in the upper wiring area, the plurality of second trace wirings is not between two first trace wirings adjacently in the first direction among the plurality of first trace wirings.

15. The display device of claim 1, wherein the display panel includes:
a first non-bending area, a bending area, and a second non-bending area arranged along the first direction,
wherein the first non-bending area includes the display area, and
wherein the bending area is bent around a virtual axis extending in a second direction intersecting the first direction.

16. A display device comprising:
a display panel having a display area and a non-display area; and
an input sensing unit on the display panel,
wherein the input sensing unit includes:
a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes,
wherein the plurality of sensing wirings includes a plurality of first trace wirings and a plurality of second trace wirings on different layers,
wherein each of the plurality of first trace wirings is connected to a first sensing pad among the plurality of sensing pads,
wherein each of the plurality of second trace wirings is connected to a second sensing pad adjacent to the first sensing pad among the plurality of sensing pads,
wherein the plurality of sensing electrodes includes a plurality of row sensing electrodes, and the plurality of row sensing electrodes includes a first row sensing electrode and a second row sensing electrode adjacent to each other in a first direction,
wherein no other sensing row sensing electrodes are located between the first row sensing electrode and the second row sensing electrode in the first direction, and
wherein the plurality of first trace wirings are connected to each of the first row sensing electrode and the second row sensing electrode.

17. The display device of claim 16, wherein the input sensing unit includes:
a first sensing insulating layer directly on the display panel;
a second sensing insulating layer on the first sensing insulating layer; and
a third sensing insulating layer on the second sensing insulating layer,
wherein the plurality of first trace wirings are on the first sensing insulating layer, and
wherein the plurality of second trace wirings are on the second sensing insulating layer.

18. The display device of claim 16, wherein the input sensing unit includes a lower wiring area including a portion in which the plurality of sensing wirings are connected to the plurality of sensing pads, and
wherein, in the lower wiring area, the plurality of first trace wirings and the plurality of second trace wirings are alternately arranged with each other.

19. The display device of claim 16, wherein the input sensing unit includes an upper wiring area including a portion in which the plurality of sensing wirings are connected to the plurality of sensing electrodes, and wherein, in the upper wiring area, some of the plurality of first trace wirings and the plurality of second trace wirings cross each other.

20. A display device comprising:

a display panel having a display area and a non-display area; and an input sensing unit on the display panel, wherein the input sensing unit includes:

a plurality of sensing pads in a pad area overlapping the non-display area, a plurality of sensing electrodes overlapping the display area and arranged in a plurality of rows and a plurality of columns, and a plurality of sensing wirings connecting the plurality of sensing pads and the plurality of sensing electrodes, wherein the plurality of sensing wirings includes a plurality of first trace wirings and a plurality of second trace wirings on different layers, wherein the input sensing unit includes a lower wiring area including a portion in which the plurality of sensing wirings are connected to the plurality of sensing pads, and the input sensing unit includes an upper wiring area including a portion in which the plurality of sensing wirings are connected to the plurality of sensing electrodes, wherein, in the lower wiring area, the plurality of first trace wirings and the plurality of second trace wirings are alternately arranged with each other, wherein, in the upper wiring area, some of the plurality of first trace wirings and the plurality of second trace wirings cross each other, and wherein the plurality of sensing electrodes includes a plurality of row sensing electrodes, and the plurality of row sensing electrodes includes a first row sensing electrode and a second row sensing electrode adjacent to each other in a first direction, and wherein no other sensing row sensing electrodes are located between the first row sensing electrode and the second row sensing electrode in the first direction.

* * * * *

UNITED STATES PATENT AND TRADEMARK OFFICE
CERTIFICATE OF CORRECTION

Page 1 of 1

PATENT NO. : 12,086,353 B2
APPLICATION NO. : 18/188327
DATED : September 10, 2024
INVENTOR(S) : Donghak Pyo et al.

It is certified that error appears in the above-identified patent and that said Letters Patent is hereby corrected as shown below:

In the Claims

In Column 24, Line 20, in Claim 1, delete "P" and insert -- and --.

Signed and Sealed this
Twenty-ninth Day of April, 2025

Coke Morgan Stewart
*Acting Director of the United States Patent and Trademark Office*